(12) United States Patent
Hamaguchi

(10) Patent No.: US 9,710,075 B2
(45) Date of Patent: Jul. 18, 2017

(54) TOUCH PANEL SYSTEM AND ELECTRONIC DEVICE

(71) Applicant: SHARP KABUSHIKI KAISHA, Osaka-shi, Osaka (JP)

(72) Inventor: Mutsumi Hamaguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/783,353

(22) PCT Filed: Apr. 3, 2014

(86) PCT No.: PCT/JP2014/059841
§ 371 (c)(1),
(2) Date: Oct. 8, 2015

(87) PCT Pub. No.: WO2014/171344
PCT Pub. Date: Oct. 23, 2014

(65) Prior Publication Data
US 2016/0070372 A1 Mar. 10, 2016

(30) Foreign Application Priority Data

Apr. 15, 2013 (JP) ................................. 2013-085295

(51) Int. Cl.
*G06F 3/0354* (2013.01)
*G06F 3/041* (2006.01)
*G06F 3/044* (2006.01)

(52) U.S. Cl.
CPC .......... *G06F 3/03545* (2013.01); *G06F 3/041* (2013.01); *G06F 3/044* (2013.01); *G06F 3/0416* (2013.01)

(58) Field of Classification Search
None
See application file for complete search history.

(56) References Cited

U.S. PATENT DOCUMENTS

| 2004/0164065 | A1 | 8/2004 | Mart | |
| 2011/0169756 | A1* | 7/2011 | Ogawa | G06F 3/03545 345/173 |
| 2012/0256830 | A1 | 10/2012 | Oda et al. | |
| 2013/0050154 | A1* | 2/2013 | Guy | G06F 3/03545 345/179 |
| 2013/0278550 | A1* | 10/2013 | Westhues | G06F 3/03545 345/174 |

(Continued)

FOREIGN PATENT DOCUMENTS

| JP | 2011-145762 A | 7/2011 |
| JP | 4857385 B2 | 1/2012 |

(Continued)

*Primary Examiner* — Seokyun Moon
*Assistant Examiner* — Douglas Wilson
(74) *Attorney, Agent, or Firm* — Birch, Stewart, Kolasch & Birch, LLP

(57) ABSTRACT

For detecting a signal based on driving of a pen point of a stylus pen satisfactorily, a stylus pen (15) includes a changeover switch (34) having a grip portion terminal (35) of a grip portion (28), a pen point terminal (36) of a pen point (38), and a ground terminal (37) of a ground, the changeover switch (34) switching connection of the grip portion terminal (35) to either the pen point terminal (36) or the ground terminal (37).

4 Claims, 15 Drawing Sheets

(56) References Cited

U.S. PATENT DOCUMENTS

| | | | |
|---|---|---|---|
| 2014/0049478 A1* | 2/2014 | Brunet | G06F 3/0416 345/173 |
| 2014/0132541 A1 | 5/2014 | Miyamoto et al. | |
| 2014/0139483 A1 | 5/2014 | Miyamoto et al. | |
| 2014/0149059 A1 | 5/2014 | Miyamoto et al. | |

FOREIGN PATENT DOCUMENTS

| | | |
|---|---|---|
| JP | 2012-221304 A | 11/2012 |
| JP | 2013-8318 A | 1/2013 |
| WO | WO 2014/042194 A1 | 3/2014 |

\* cited by examiner

TOUCH PANEL SYSTEM AND ELECTRONIC DEVICE

TECHNICAL FIELD

The present invention relates to a touch panel system including a stylus pen for touching a touch panel which has a plurality of electrostatic capacitances formed at respective intersections of a plurality of first signal lines and a plurality of second signal lines and a touch panel controller that detects a position of the stylus pen, and particularly relates to a touch panel system including a touch panel controller that drives a plurality of first signal lines and a plurality of second signal lines alternately.

BACKGROUND ART

An electronic pen (stylus pen) system for touching a touch panel which has a plurality of electrostatic capacitances formed at respective intersections of a plurality of first signal lines and a plurality of second signal lines is described in PTL 1. A conventional technique thereof is composed as follows.

The electronic pen system includes an electronic pen, a touch panel body provided with a touch screen on which touch operation by the electronic pen or a finger is performed, a position detection apparatus that detects a position touched by the electronic pen or the finger on the touch screen, a display apparatus that displays a desired image on the touch screen serving as a display screen, and a control apparatus that causes the display apparatus to display an image according to position detection information which is obtained from the position detection apparatus.

The control apparatus includes input device discrimination means that, when receiving the position detection information from the position detection apparatus, discriminates which of the electronic pen and the finger has caused the position detection information, first control means that performs predetermined pen-input processing according to touch operation by the electronic pen, and second control means that performs predetermined finger-input processing according to touch operation by the finger.

The electronic pen includes pen information transmission means that transmits predetermined pen information to the control apparatus, a connection switch that connects or disconnects electrical connection between a pen point portion and a grip portion, which are provided in a state of being electrically disconnected from each other, and touch state detection means that detects a state in which the electronic pen touches the touch screen. In response to the detection of the touch state by the touch state detection means, the pen information transmission means transmits pen information to the control apparatus and then turns on the connection switch to provide a state where pen-input is available.

CITATION LIST

Patent Literature

PTL 1: Japanese Patent. No. 4857385 (Registration Date: Nov. 4, 2011)

SUMMARY OF INVENTION

Technical Problem

According to the aforementioned configuration of the conventional technique, the connection switch is turned on after a certain time has lapsed after pressing of a pen is detected and the pen information is subjected to radio transmission from the electronic pen, and is then turned off after being in a state where pressing of the pen has not been detected for a certain amount of time. With the aforementioned operation, the control apparatus is able to distinguish touch by the pen and touch by the finger.

On the other hand, a technique has been focused on recently that drives a pen point of a stylus pen for touching a touch panel, which has a plurality of electrostatic capacitances formed at respective intersections of a plurality of first signal lines and a plurality of second signal lines, to detect a position of the stylus pen on the touch panel. Further, it is requested to apply the technique to a touch panel controller of an electrostatic capacitance type for driving the first signal lines and the second signal lines alternately to enhance performance of the touch panel system.

A configuration in which a stylus pen and a touch panel controller are connected by cable and a pen point of the stylus pen is driven by cable with the touch panel controller is also considered, but from a viewpoint of operability, a configuration in which the pen point of the stylus pen is driven by radio is strongly requested. Therefore, considered is a configuration in which a synchronization circuit which synchronizes driving operation of the first and second signal lines of the touch panel controller and driving operation of the pen point of the stylus pen and a driving circuit which drives the pen point of the stylus pen are provided in the stylus pen.

However, since the stylus pen is composed of a conductor, when a user drives the pen point of the stylus pen while gripping the stylus pen, a human body of the user gripping the stylus pen is driven similarly to the pen point, so that even a palm placing region where the user places his/her palm on a touch panel is driven similarly to the pen point. Thus, there is a problem that a signal based on the driving of the pen point is buried in a signal based on the driving, of the palm placing region and a position of the pen point on the touch panel becomes difficult to be detected.

An object of the invention is to provide a touch panel system capable of satisfactorily detecting a signal based on driving of a pen point of a stylus pen.

Solution to Problem

In order to solve the problem described above, a touch panel system according to one aspect of the invention is a touch panel system including: a stylus pen for touching a touch panel which has M first signal lines (M is plural), K second signal lines (K is plural) which intersect with the M first signal lines, and (M×K) electrostatic capacitances formed at respective intersections of the first signal lines and the second signal lines; and a touch panel controller that detects a position of the stylus pen, in which the stylus pen has: a grip portion to be gripped by a user; a pen point that touches the touch panel; a ground having a ground potential; and a changeover switch that connects the grip portion to either the pen point or the ground.

In order to solve the problem described above, another touch panel system according to one aspect of the invention is a touch panel system including: a plurality of stylus pens for touching a touch panel which has M first signal lines (M is plural), K second signal lines (K is plural) which intersect with the M first signal lines, and (M×K) electrostatic capacitances formed at respective intersections of the first signal lines and the second signal lines; and a touch panel controller that detects a position of each of the stylus pens, in which each of the stylus pens has: a grip portion to be gripped by a user; a pen point that touches the touch panel; a ground having a ground potential; and a changeover switch that connects the grip portion to either the pen point or the ground.

In order to solve the problem described above, an electronic device according to one aspect of the invention includes the touch panel system according to one aspect of the invention.

Advantageous Effects of Invention

According to one aspect of the invention, when the changeover switch connects the grip portion to the ground, it is possible to generate a difference of potential between the pen point and the grip portion. Thus, when the pen point of the stylus pen is driven, a human body of a user gripping the grip portion is prevented from being driven. Accordingly, it is possible to block driving of even a palm placing region where the user places his/her palm on the touch panel similarly to the pen point, so that it does not occur that a signal based on the driving of the pen point is buried in a signal based on the driving of the palm placing region. As a result thereof, an effect is exerted that the signal based on the driving of the pen point of the stylus pen is able to be detected satisfactorily.

DESCRIPTION OF EMBODIMENTS

Embodiments of the invention will hereinafter be described in detail based on FIG. 1 to FIG. 16.

Embodiment 1

An embodiment 1 of the invention will be described based on FIG. 1 to FIG. 8 as follows.

(Configurations of Touch Panel System 1 and Stylus Pen 15)

Figure 1:
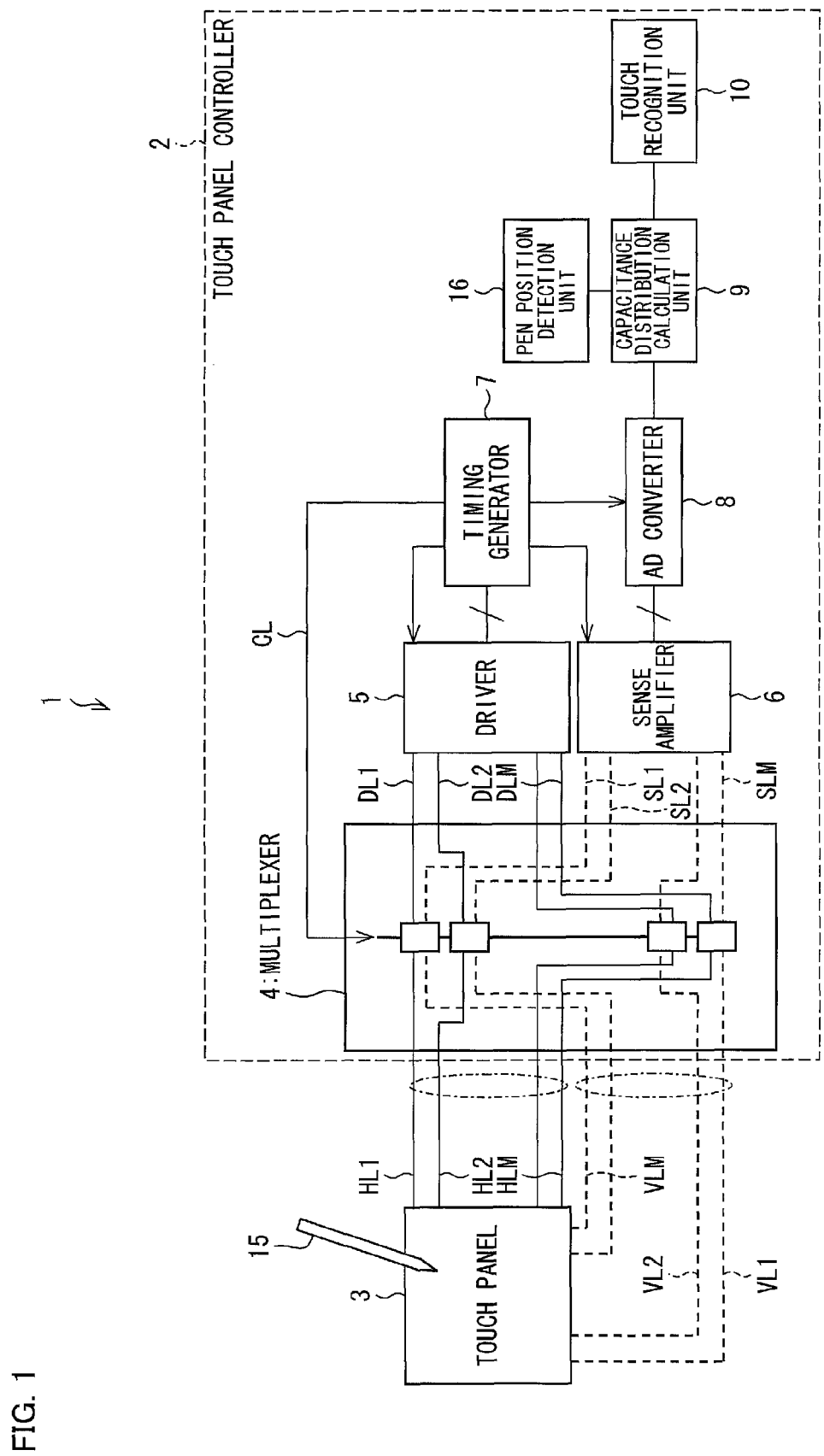
FIG. 1 is a block diagram illustrating a configuration of a touch panel system according to an embodiment 1.
Figure 2:
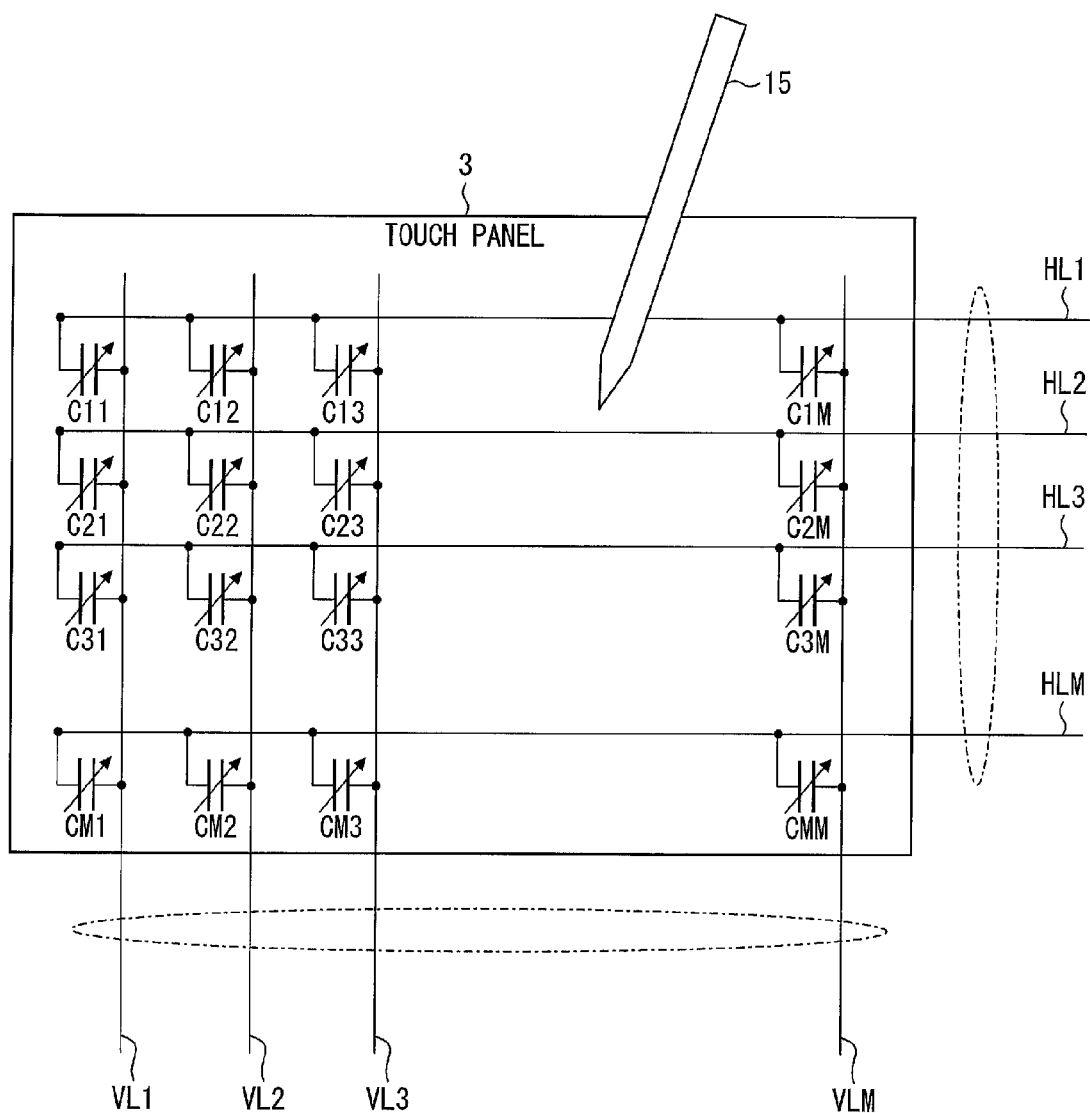
FIG. 2 is a schematic view illustrating a configuration of a touch panel provided in the touch panel system.

FIG. 1 is a block diagram illustrating a configuration of a touch panel system 1 according to the embodiment 1. FIG. 2 is a schematic view illustrating a configuration of a touch panel 3 provided in the touch panel system 1.

The touch panel system 1 includes the touch panel 3, a touch panel controller 2, and a stylus pen 15. The touch panel 3 includes a plurality of signal lines VL1 to VLM (second signal lines) which are arranged in parallel to each other along a vertical direction, a plurality of signal lines HL1 to HLM (first signal lines) which are arranged in parallel to each other along a horizontal direction, and electrostatic capacitances C11 to CMM which are respectively formed at intersections of the signal lines HL1 to HLM and the signal lines VL1 to VLM. The touch panel 3 preferably has an area in which a hand gripping the stylus pen 15 is able to be placed, but may have a size for a smartphone.

Figure 5:
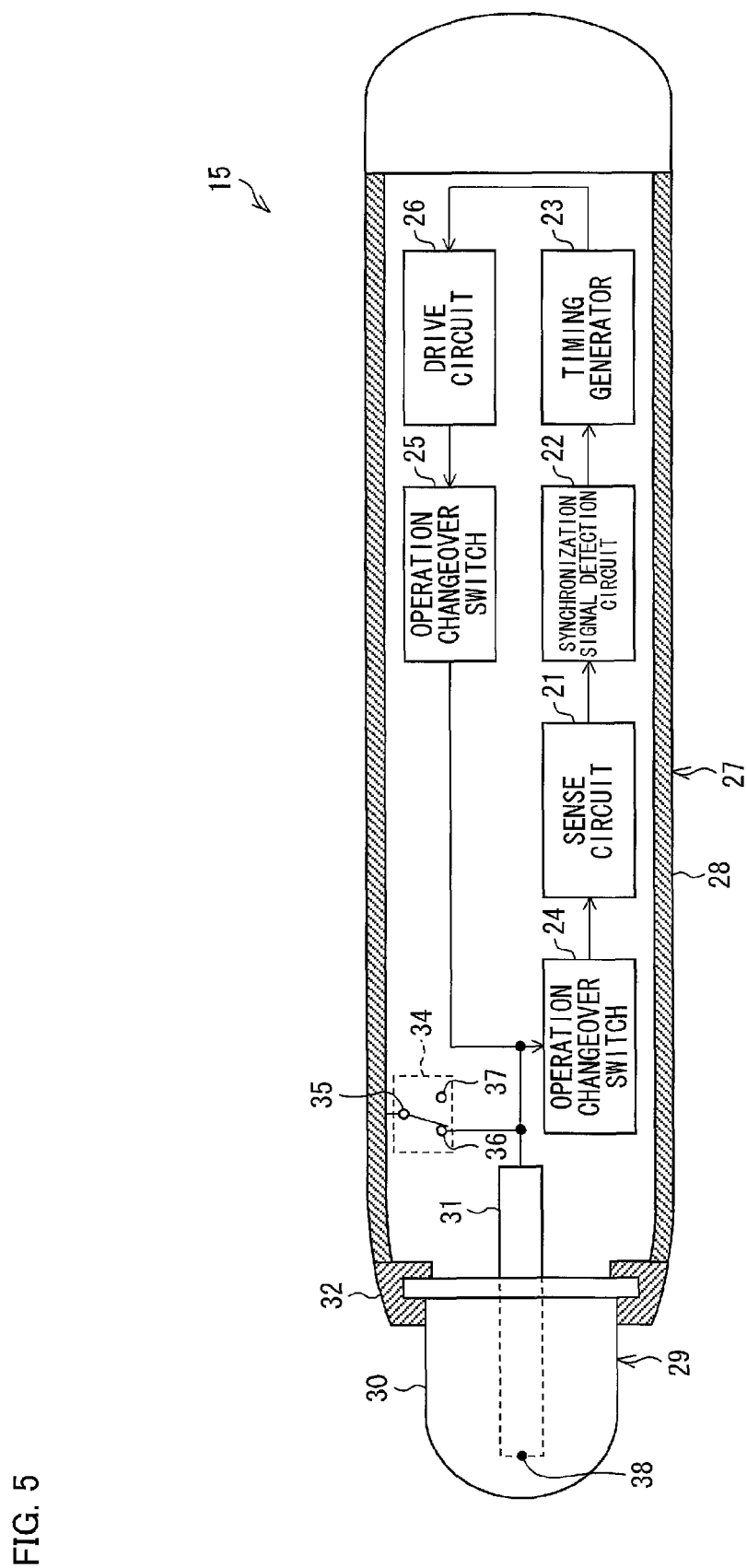
FIG. 5 is a block diagram schematically illustrating a configuration of a stylus pen provided in the touch panel system.

FIG. 5 is a block diagram schematically illustrating a configuration of the stylus pen 15 provided in the touch panel system 1. The stylus pen 15 includes a pen main body 27 which has a conductive grip portion 28 formed in a substantially cylindrical shape to be gripped with a hand of a user, and a pen point portion 29 which is pushed against the touch panel 3 at a time of touch operation. The pen point portion 29 has a pen point cover 30 and a pen point rod 31. The pen point rod 31 has a pen point 38 at a tip thereof. The pen point cover 30 is formed with a conductive felt material and the pen point rod 31 is formed with a conductive synthetic resin. The pen point portion 29 is held by the pen main body 27 through an insulating body 32. The pen point rod 31 is supported by a not-shown guide member so as to be movable in an axis direction. At the time of touch operation, when the pen point portion 29 is pressed against the touch panel 3, the pen point cover 30 formed with the felt material is depressed and the pen point rod 31 is pressed by the touch panel 3.

The stylus pen 15 has a sense circuit 21, a synchronization signal detection circuit 22, a timing generator (timing adjustment circuit) 23, operation changeover switches 24 and 25, and a drive circuit 26.

The stylus pen 15 is provided with a changeover switch 34. The changeover switch 34 has a grip portion terminal 35 connected to the grip portion 28, a pen point terminal 36 connected to the pen point 38, and a ground terminal 37 having a ground potential. The changeover switch 34 switches connection of the grip portion terminal 35 to either the pen point terminal 36 or the ground terminal 37.

The touch panel controller 2 includes a driver 5. The driver 5 applies voltage to drive lines DL1 to DLM based on M coded sequences among (M+1) coded sequences having a length N.

The drive circuit 26 of the stylus pen 15 applies voltage to the pen point 38 of the stylus pen 15 based on the remaining one coded sequence among the (M+1) coded sequences in synchronization with the driver 5.

The touch panel controller 2 is provided with a sense amplifier 6. In a first driving step, the sense amplifier 6 reads, through sense lines SL1 to SLM, a linear sum signal that corresponds to charges of the respective electrostatic capacitances C11 to CMM and charges of electrostatic capacitances between the stylus pen 15 and the respective M signal lines VL1 to VLM (first pen signal), to supply to an AD converter 8.

In a second driving step, the sense amplifier 6 reads, through the sense lines SL1 to SLM, a linear sum signal that corresponds to the charges of the respective electrostatic capacitances C11 to CMM and charges of electrostatic capacitances between the stylus pen 15 and the respective M signal lines HL1 to HLM (second pen signal), to supply to the AD converter 8.

Figure 3:
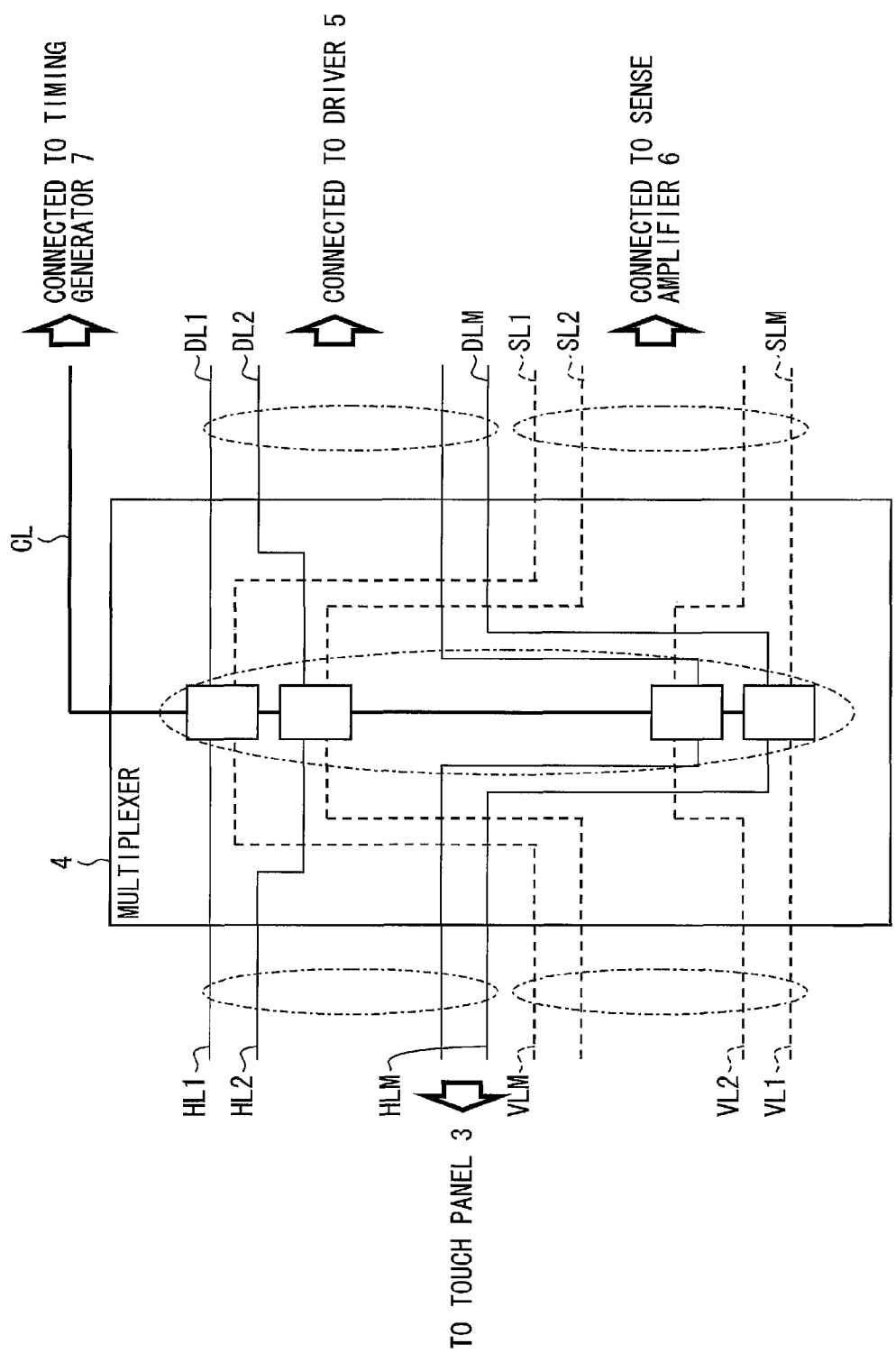
FIG. 3 is a circuit diagram illustrating a configuration of a multiplexer for switching connection between signal lines connected to the touch panel and lines including drive lines connected to a driver and sense lines connected to a sense amplifier.

The touch panel controller 2 has a multiplexer 4. FIG. 3 is a circuit diagram illustrating a configuration of a connection switching circuit for switching connection between the signal lines HL1 to HLM and VL1 to VLM connected to the touch panel 3 and lines including the drive lines DL1 to DLM connected to the driver 5 and the sense lines SL1 to SLM connected to the sense amplifier 6.

The multiplexer 4 switches a first connection state where the signal lines HL1 to HLM are connected to the drive lines DL1 to DLM of the driver 5 and the signal lines VL1 to VLM are connected to the sense lines SL1 to SLM of the sense amplifier 6, and a second connection state where the signal lines HL1 to HLM are connected to the sense lines SL1 to SLM of the sense amplifier 6 and the signal lines VL1 to VLM are connected to the drive lines DL1 to DLM of the driver 5.

Figure 4:
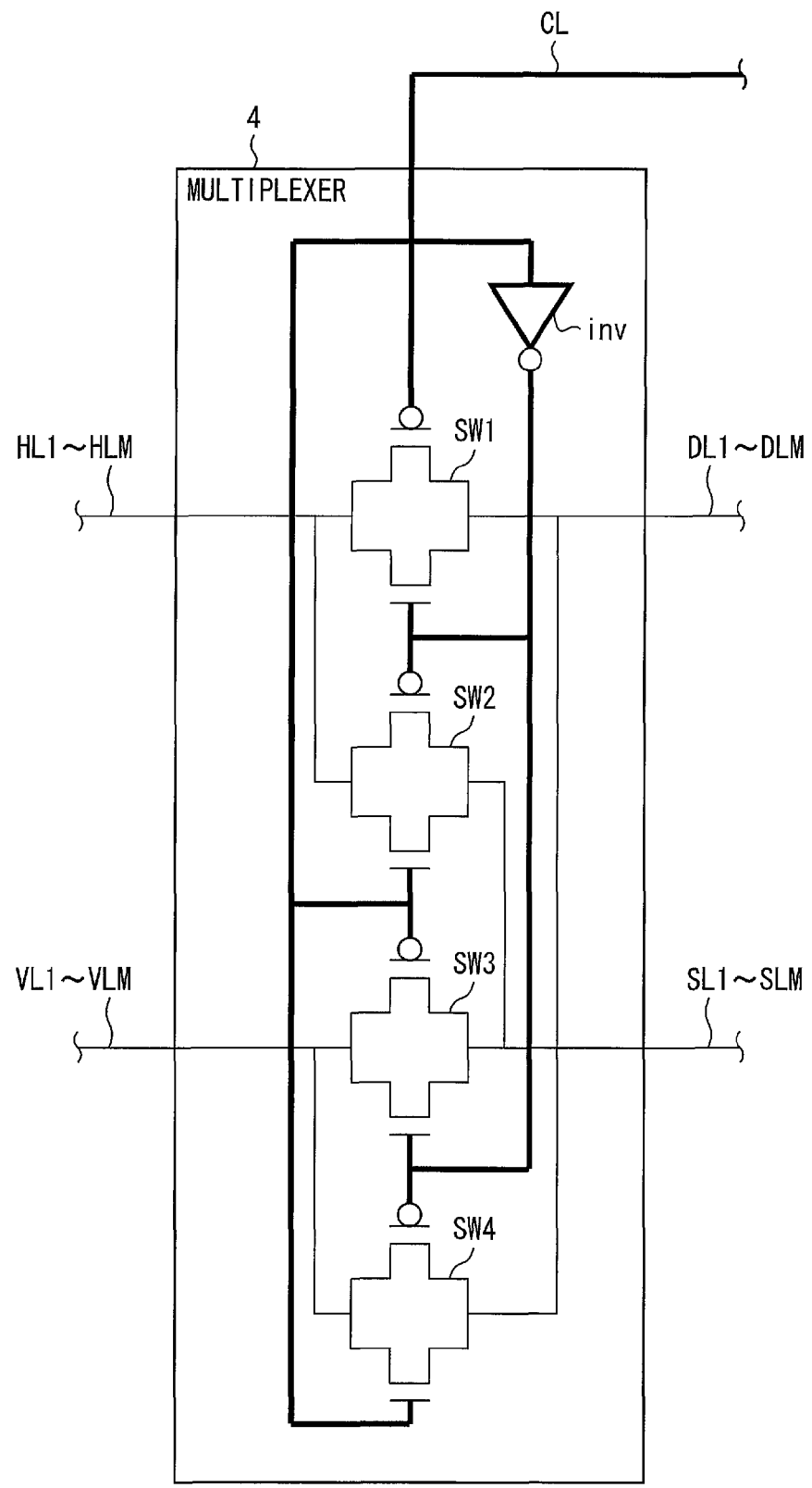
FIG. 4 is a circuit diagram illustrating a detailed configuration of the multiplexer.

FIG. 4 is a circuit diagram illustrating a configuration of the multiplexer 4 provided in the touch panel controller 2 of the touch panel system 1. The multiplexer 4 has four CMOS switches SW1 to SW4 which are connected in series. A control line CL from a timing generator 7 is connected to a gate of a PMOS of the CMOS switch SW1, a gate of an NMOS of the CMOS switch SW2, a gate of a PMOS of the CMOS switch SW3, a gate of an NMOS of the CMOS switch SW4, and an input of an inverter inv. An output of the inverter inv is connected to a gate of an NMOS of the CMOS switch SW1, a gate of a PMOS of the CMOS switch SW2, a gate of an NMOS of the CMOS switch SW3, and a gate of a PMOS of the CMOS switch SW4. The signal lines HL1 to HLM are connected to the CMOS switches SW1 and SW2. The signal lines VL1 to VLM are connected to the CMOS switches SW3 and SW4. The drive lines DL1 to DLM are connected to the CMOS switches SW1 and SW4. The sense lines SL1 to SLM are connected to the CMOS switches SW2 and SW3.

When a signal of the control line CL is set to be Low, the signal lines HL1 to HLM are connected to the drive lines DL1 to DLM and the signal lines VL1 to VLM are connected to the sense lines SL1 to SLM. When the signal of the control line CL is set to be High, the signal lines HL1 to HLM are connected to the sense lines SL1 to SLM and the signal lines VL1 to VLM are connected to the drive lines DL1 to DLM.

In the first driving step, the AD converter 8 performs AD conversion for the linear sum signal corresponding to the charges of the respective electrostatic capacitances C11 to CMM and the charges of the electrostatic capacitances between the stylus pen 15 and the respective M signal lines VL1 to VLM (first pen signal), which are read through the signal lines VL1 to VLM and the sense lines SL1 to SLM, to supply to a capacitance distribution calculation unit 9.

In the second driving step, the AD converter 8 performs AD conversion for the linear sum signal corresponding to the charges of the respective electrostatic capacitances C11 to CMM and the charges of the electrostatic capacitances between the stylus pen 15 and the respective M signal lines HL1 to HLM (second pen signal), which are read through the signal lines HL1 to HLM and the sense lines SL1 to SLM, to supply to the capacitance distribution calculation unit 9.

Based on the aforementioned linear sum signals including the first pen signal and the second pen signal, and the aforementioned (M+1) coded sequences having the length N, the capacitance distribution calculation unit 9 calculates distribution of the electrostatic capacitances on the touch panel 3, distribution of the electrostatic capacitances between the stylus pen 15 and the respective M signal lines VL1 to VLM, and distribution of the electrostatic capacitances between the stylus pen 15 and the respective M signal lines HL1 to HLM, and supplies the distribution of the electrostatic capacitances on the touch panel 3 to a touch recognition unit 10, as well as supplies the distribution of the electrostatic capacitances between the stylus pen 15 and the respective M signal lines VL1 to VLM and the distribution of the electrostatic capacitances between the stylus pen 15 and the respective M signal lines HL1 to HLM to a pen position detection unit 16 (position detection means). The touch recognition unit 10 recognizes a touched position on the touch panel 3 based on the distributions of the electrostatic capacitances supplied from the capacitance distribution calculation unit 9.

The pen position detection unit 16 detects a position of the stylus pen 15 along the signal line HL1 based on the distribution of the electrostatic capacitances between the stylus pen 15 and the respective M signal lines VL1 to VLM. The pen position detection unit 16 further detects a position of the stylus pen 15 along the signal line VL1 based on the distribution of the electrostatic capacitances between the stylus pen 15 and the respective M signal lines HL1 to HLM.

The touch panel controller 2 has the timing generator 7. The timing generator 7 generates a signal defining operation of the driver 5, a signal defining operation of the sense amplifier 6 and a signal defining operation of the AD converter 8 to supply to the driver 5, the sense amplifier 6 and the AD converter 8.

The sense circuit 21, the synchronization signal detection circuit 22 and the timing generator 23 are mounted in the stylus pen 15 to synchronize the touch panel controller 2 with the stylus pen 15. The timing generator 7 of the touch panel controller 2 generates a synchronization signal to synchronize with the stylus pen 15. The touch panel controller 2 drives the touch panel 3 with the synchronization signal for synchronization. The stylus pen 15 obtains the synchronization signal from the touch panel 3 with the mounted sense circuit 21, and the synchronization signal is supplied to the synchronization signal detection circuit 22. Upon acquirement of synchronization by the synchronization signal detection circuit 22, the pen point 38 of the stylus pen 15 is driven by the drive circuit 26 at a driving timing which is determined in advance.

In this manner, the driver 5 drives the signal lines HL1 to HLM in parallel and drives the signal lines VL1 to VLM in parallel.

(Operation of Touch Panel System 1 and Stylus Pen 15)

Figure 6:
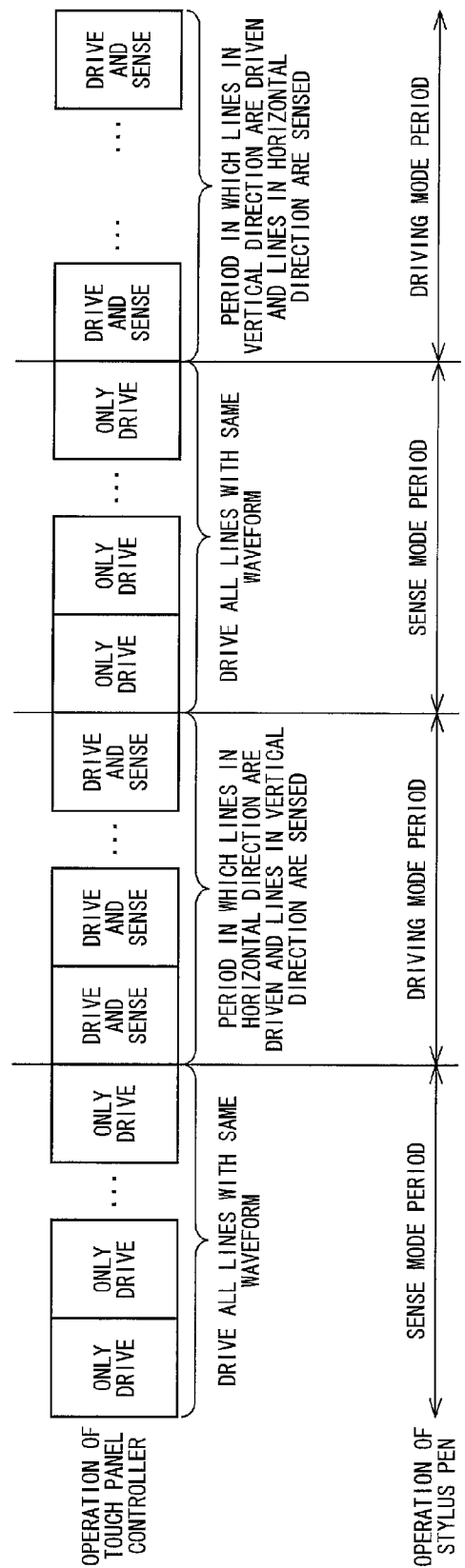
FIG. 6 is a view describing a correlation between driving operation of a touch panel controller provided in the touch panel system and driving operation of the stylus pen.

FIG. 6 is a view describing a correlation between driving operation of the touch panel controller 2 and driving operation of the stylus pen 15. A period of the driving operation of the stylus pen 15 includes a sense mode period for detecting the synchronization signal from the touch panel controller 2 by the synchronization signal detection circuit 22 and a driving mode period for driving the pen point 38 by the drive circuit 26. During a period in which the touch panel controller 2 outputs the synchronization signal, the driver 5 drives all the drive lines or all the lines (HL1 to HLM and VL1 to VLM in the example of FIG. 2) with the same waveform (synchronization signal).

When the synchronization signal detection circuit 22 detects the synchronization signal from the touch panel controller 2, shifting is performed to the driving mode period. The touch panel controller 2 drives the signal lines HL1 to HLM after the period in which the synchronization signal for driving all the lines with the same waveform (synchronization signal) is output ends. That is, shifting is performed to a period when the lines in the horizontal direction (signal lines HL1 to HLM) are driven and the lines in the vertical direction (signal lines VL1 to VLM) are sensed. Further, shifting is performed again to the period when all the lines are driven with the same waveform (synchronization signal), and when the period ends, the signal lines VL1 to VLM are then driven. That is, shifting is performed to the driving mode period in which the lines in the vertical direction (signal lines VL1 to VLM) are driven and the lines in the horizontal direction (signal lines HL1 to HLM) are sensed. During the driving mode period, the drive circuit 26 of the stylus pen 15 drives the pen point 38 in synchronization with the driving of the touch panel controller 2.

Figure 7:
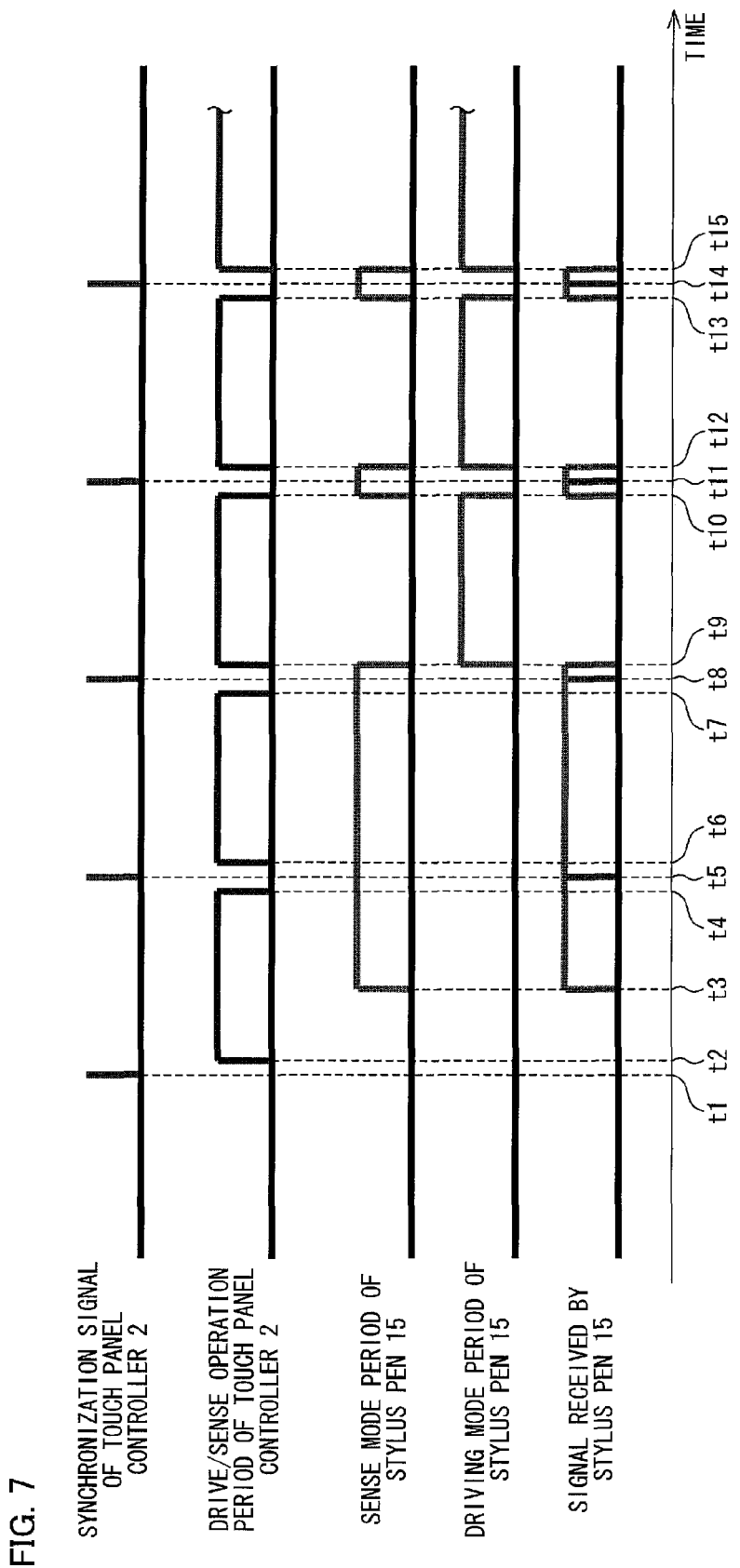
FIG. 7 is a timing chart of the driving operation of the touch panel controller and the stylus pen.

FIG. 7 is a timing chart of driving operation of the touch panel controller 2 and the stylus pen 15. First, the touch panel controller 2 drives the signal lines HL1 to HLM and the signal lines VL1 to VLM with a synchronization signal at a time t1. Then, the touch panel controller 2 drives the signal lines HL1 to HLM with a coded sequence at a time t2.

Then, at a time t3, power of the stylus pen 15 is turned on, the operation changeover switch 24 is turned on, an operation changeover switch 25 is turned off and the changeover switch 34 connects the grip portion terminal 35 to the pen point terminal 36, so that the sense mode period starts. Thereafter, at a time t4, the touch panel controller 2 finishes the driving of the signal lines HL1 to HLM.

The touch panel controller 2 then drives the signal lines HL1 to HLM and the signal lines VL1 to VLM with a next synchronization signal at a time t5. The sense circuit 21 of the stylus pen 15 receives the next synchronization signal through the operation changeover switch 24. Next, at a time t6, the touch panel controller 2 drives the signal lines VL1 to VLM with a corded sequence. The touch panel controller 2 then finishes the driving of the signal lines VL1 to VLM at a time t7.

At a time t8, the touch panel controller 2 drives the signal lines HL1 to HLM and the signal lines VL1 to VLM with a third synchronization signal. The sense circuit 21 of the stylus pen 15 receives the third synchronization signal through the operation changeover switch 24. The synchronization signal detection circuit 22 detects the third synchronization signal which has been received by the sense circuit 21.

Next, at a time t9, the sense mode period of the stylus pen 15 ends and the driving mode period starts. The operation changeover switch 24 is turned off and the operation changeover switch 25 is turned on. The changeover switch 34 connects the grip portion terminal 35 to the ground terminal 37. The timing generator 23 drives the drive circuit 26 based on the third synchronization signal and the drive circuit 26 drives the pen point 38 through the operation changeover switch 25. The touch panel controller 2 drives the signal lines HL1 to HLM with the coded sequence based on the third synchronization signal.

Next, at a time t10, the driving mode period of the stylus pen 15 ends and a next sense mode period starts. The operation changeover switch 25 is turned off and the operation changeover switch 24 is turned on. The changeover switch 34 connects the grip portion terminal 35 to the pen point terminal 36. The touch panel controller 2 finishes the driving of the signal lines HL1 to HLM based on the third synchronization signal.

The touch panel controller 2 then drives the signal lines HL1 to HLM and the signal lines VL1 to VLM with a fourth synchronization signal at a time t11. The sense circuit 21 of the stylus pen 15 receives the fourth synchronization signal through the operation changeover switch 24. The synchronization signal detection circuit 22 detects the fourth synchronization signal which has been received by the sense circuit 21.

Next, at a time t12, the next sense mode period of the stylus pen 15 ends and a next driving mode period starts. The operation changeover switch 24 is turned off again and the operation changeover switch 25 is turned on again. The changeover switch 34 connects the grip portion terminal 35 to the ground terminal 37. The timing generator 23 drives the drive circuit 26 based on the fourth synchronization signal and the drive circuit 26 drives the pen point 38 through the operation changeover switch 25. The touch panel controller 2 drives the signal lines VL1 to VLM with the coded sequence based on the fourth synchronization signal.

Next, at a time t13, the next driving mode period of the stylus pen 15 ends and a third sense mode period starts. The operation changeover switch 25 is turned off and the operation changeover switch 24 is turned on. The changeover switch 34 connects the grip portion terminal 35 to the pen point terminal 36. The touch panel controller 2 finishes the driving of the signal lines VL1 to VLM based on the fourth synchronization signal.

The touch panel controller 2 then drives the signal lines HL1 to HLM and the signal lines VL1 to VLM with a fifth synchronization signal at a time t14. The sense circuit 21 of the stylus pen 15 receives the fifth synchronization signal through the operation changeover switch 24. The synchronization signal detection circuit 22 detects the fifth synchronization signal which has been received by the sense circuit 21.

Similar operation is repeated at a time t15 and subsequent times.

(Aspect of Inverted Driving)

An aspect of inverted driving of the signal lines HL1 to HLM and the signal lines VL1 to VLM by the touch panel controller 2 will be described specifically below.

First, in the first connection state where the signal lines HL1 to HLM are connected to the drive lines DL1 to DLM of the driver 5 and the signal lines VL1 to VLM are connected to the sense lines SL1 to SLM of the sense amplifier 6, the driver 5 applies voltage to the drive lines DL1 to DLM to drive the signal lines HL1 to HLM based on a first one of the M coded sequences among the (M+1) coded sequences having the length. N. In synchronization therewith, the drive circuit 26 of the stylus pen 15 applies voltage to the pen point 38 based on the remaining one coded sequence among the (M+1) coded sequences.

Here, the first coded sequence among the (M+1) coded sequences having the length N forms a "first coded sequence".

Then, M first linear sum signals based on the charges accumulated in the respective electrostatic capacitances C11 to CMM by the driving of the signal lines HL1 to HLM and the charges of the electrostatic capacitances between the stylus pen 15 and the respective M signal lines VL1 to VLM (first pen signal) are output from the respective M signal lines VL1 to VLM (first driving step). The sense amplifier 6 reads the M first linear sum signals including the first pen signal through the multiplexer 4 and the sense lines SL1 to SLM to supply to the AD converter 8. The AD converter 8 performs AD conversion for the M first linear sum signals including the first pen signal to output to the capacitance distribution calculation unit 9.

Next, the first connection state where the signal lines HL1 to HLM are connected to the drive lines DL1 to DLM of the driver 5 and the signal lines VL1 to VLM are connected to the sense lines SL1 to SLM of the sense amplifier 6 is switched to the second connection state where the signal lines HL1 to HLM are connected to the sense lines SL1 to SLM of the sense amplifier 6 and the signal lines VL1 to VLM are connected to the drive lines DL1 to DLM of the driver 5.

The driver 5 then applies voltage to the drive lines DL1 to DLM to drive the signal lines VL1 to VLM based on the M coded sequences among second (M+1) coded sequences. At the same time, the drive circuit 26 of the stylus pen 15 applies voltage to the pen point 38 based on the remaining one coded sequence among the second (M+1) coded sequences. Here, the second coded sequence among the (M+1) coded sequences having the length N forms a "second coded sequence".

Then, M second linear sum signals based on the charges accumulated in the respective electrostatic capacitances C11 to CMM by the driving of signal lines VL1 to VLM and the charges of the electrostatic capacitances between the stylus pen 15 and the respective M signal lines HL1 to HLM (second pen signal) are output from the respective M signal lines HL1 to HLM (second driving step). The sense amplifier 6 reads the M second linear sum signals including the second pen signal through the multiplexer 4 and the sense lines SL1 to SLM to supply to the AD converter 8. The AD converter 8 performs AD conversion for the M second linear sum signals including the second pen signal to output to the capacitance distribution calculation unit 9.

Next, based on the aforementioned first linear sum signals including the first pen signal, the aforementioned second linear sum signals including the second pen signal and the (M+1) coded sequences, the capacitance distribution calculation unit 9 calculates distribution of the electrostatic capacitances on the touch panel 3 to supply to the touch recognition unit 10, as well as calculates a position of the stylus pen 15 along the signal line HL1 and a position of the stylus pen 15 along the signal line VL1 to supply to the pen position detection unit 16 (position detection step).

The touch recognition unit 10 then recognizes a position touched on the touch panel 3 based on the distribution of the electrostatic capacitances supplied from the capacitance distribution calculation unit 9. The pen position detection unit 16 detects the position of the stylus pen 15 on the touch panel 3 based on the position of the stylus pen 15 along the signal line HL1 and the position of the stylus pen 15 along the signal line VL1, which are calculated by the capacitance distribution calculation unit 9.

Modified Example

Figure 8:
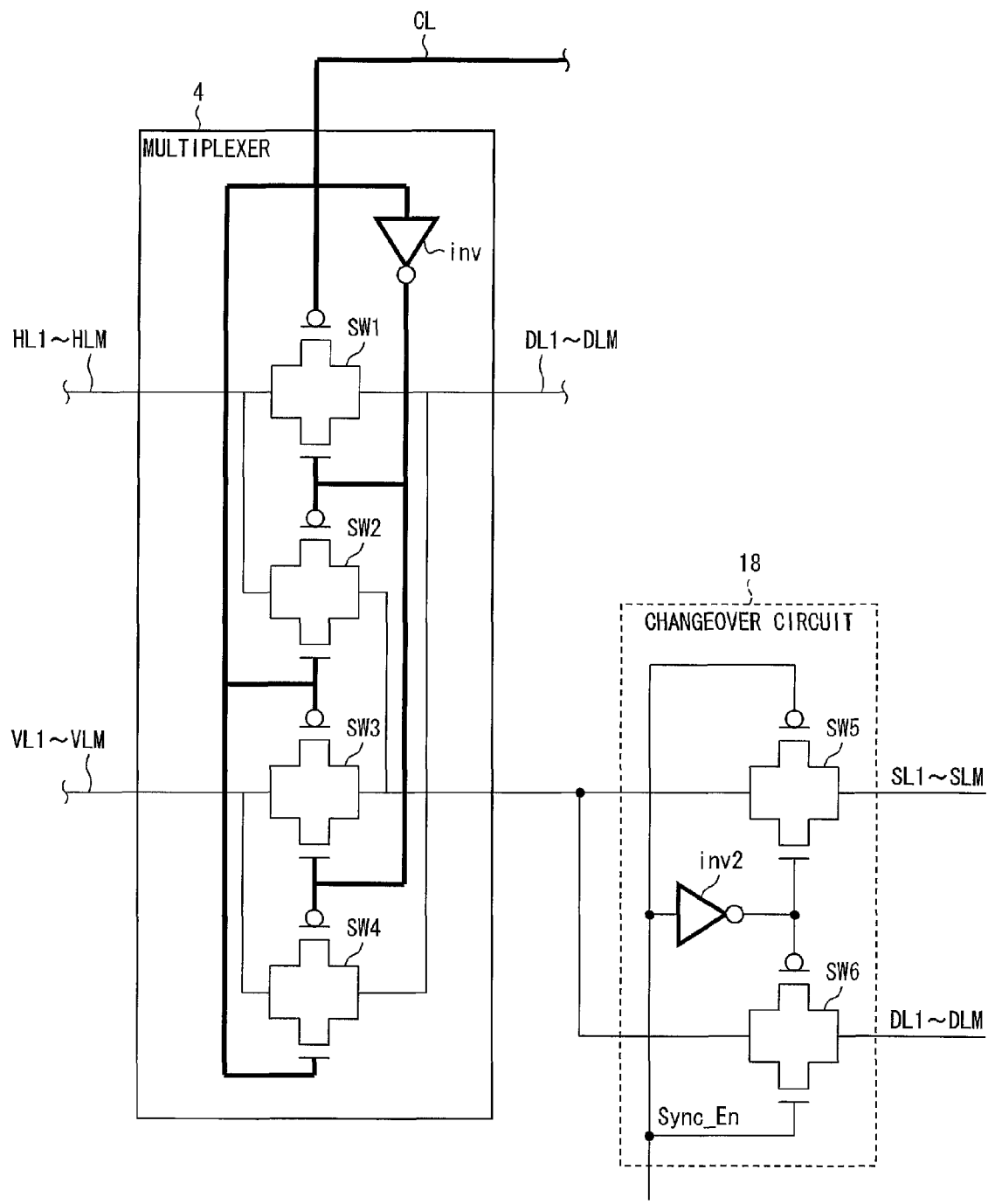
FIG. 8 is a block diagram illustrating configurations of a multiplexer and a changeover circuit of a touch panel system according to a modified example of the embodiment 1.

FIG. 8 is a block diagram illustrating configurations of the multiplexer 4 and a changeover circuit 18 of a touch panel system according to a modified example of the embodiment 1.

In order to facilitate sense operation of the stylus pen 15, the touch panel controller 2 may be composed to drive an entire surface (the signal lines VL1 to VLM and the signal lines HL1 to HLM) of the touch panel 3 as described above when the touch panel controller 2 outputs the synchronization signal. This is because it is possible to increase a level of a signal which is able to be obtained by the stylus pen 15 and the operation of the sense mode becomes more facilitated.

The changeover circuit 18 has two CMOS switches SW5 to SW6 which are connected in series. A control line Sync_En from the timing generator 7 is connected to a gate of a PMOS of the CMOS switch SW5, a gate of an NMOS of the CMOS switch SW6, and an input of an inverter inv2. An output of the inverter inv2 is connected to a gate of an NMOS of the CMOS switch SW5 and a gate of a PMOS of the CMOS switch SW6. The signal line from the multiplexer 4 is connected to the CMOS switches SW5 and SW6. The drive lines DL1 to DLM are connected to the CMOS switch SW6. The sense lines SL1 to SLM are connected to the CMOS switch SW5.

In a configuration where both of the signal lines VL1 to VLM and the signal lines HL1 to HLM of the touch panel 3 are driven, the driver 5 drives the signal lines VL1 to VLM and the signal lines HL1 to HLM at the same time through the drive lines DL1 to DLM. As shown in FIG. 8, the changeover circuit 18 is added. The changeover circuit 18 connects the drive lines DL1 to DLM to the multiplexer 4 when the touch panel controller 2 outputs the synchronization signal to the stylus pen 15. As a result thereof, the drive lines DL1 to DLM are able to be connected to both of the signal lines VLA to VLM and the signal lines HL1 to HLM.

At a time of collecting capacitance information (when carrying out the first driving step and the second driving step, when carrying out first driving means and second driving means), the sense lines SL1 to SLM are connected to the multiplexer 4 by the changeover circuit 18. As a result thereof, the first connection state where the drive lines DL1 to DLM are connected to the signal lines HL1 to HLM and the sense lines SL1 to SLM are connected to the signal lines VL1 to VLM and the second connection state where the drive lines DL1 to DLM are connected to the signal lines VL1 to VLM and the sense lines SL1 to SLM are connected to the signal lines HL1 to HLM are switched by the multiplexer 4.

Another Modified Example

Figure 9:
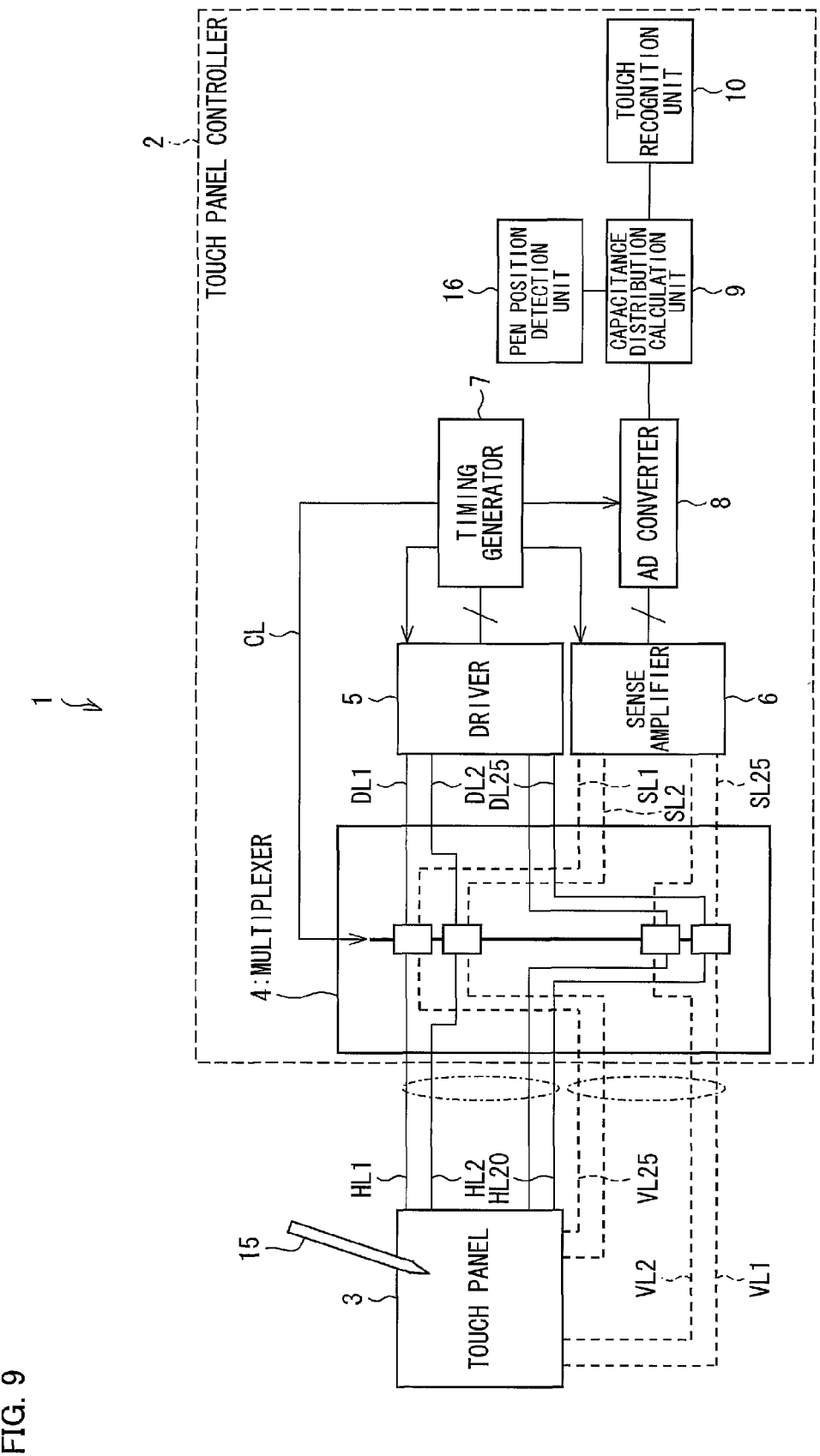
FIG. 9 is a block diagram illustrating a configuration of a touch panel system according to another modified example of the embodiment 1.

FIG. 9 is a block diagram illustrating a configuration of a touch panel system 1 according to another modified example of the embodiment 1. Note that, for convenience of description, the same reference signs are assigned to members having the same functions as those of the members described in FIG. 1 above and description thereof will be omitted.

In the example shown in FIG. 1, shown is an example in which the number of the signal lines in the horizontal direction and the number of the signal lines in the vertical direction are the same (M) in the touch panel 3. However, the invention is not limited thereto. The number of the signal lines in the horizontal direction and the number of the signal lines in the vertical direction may be different.

The touch panel 3 shown in FIG. 9 has twenty-five signal lines VL1 to VL25 and twenty signal lines HL1 to HL20. Twenty-five drive lines DL1 to DL25 are connected to the driver 5 and twenty-five sense lines SL1 to SL25 are connected to the sense amplifier 6.

In such a case, in the first connection state, the driver 5 applies voltage to the drive lines DL1 to DL20 to drive the signal lines HL1 to HL20 based on twenty coded sequences among twenty-one coded sequences. The drive circuit 26 of the stylus pen 15 drives the pen point 38 of the stylus pen 15 based on the remaining one coded sequence among the twenty-one code sequences. Here, the twenty-one coded sequences correspond to the "first coded sequence".

The capacitance distribution calculation unit 9 then estimates a touch position of the stylus pen 15 along the horizontal direction based on distribution of electrostatic capacitances between the stylus pen 15 and the respective signal lines VL1 to VL25.

Next, in the second connection state, the driver 5 applies voltage to the drive lines DL1 to DL25 to drive the signal lines VL1 to VL25 based on twenty-five coded sequences among twenty-six coded sequences. The drive circuit 26 of the stylus pen 15 drives the pen pint 38 of the stylus pen 15 based on the remaining one coded sequence among the twenty-six coded sequences. Here, the twenty-six coded sequences correspond to the "second coded sequence".

Thereafter, the capacitance distribution calculation unit 9 estimates a touch position of the stylus pen 15 along the vertical direction based on distribution of electrostatic capacitances between the stylus pen 15 and the respective signal lines HL1 to HL20.

Effect

The aforementioned embodiment 1 exerts the following effect.

Since the changeover switch 34 that switches connection of the grip portion terminal 35 to either the pen point terminal 36 or the ground terminal 37 of the stylus pen 15 is provided in the stylus pen 15, it is possible that the grip portion terminal 35 of the changeover switch 34 is connected to the pen point terminal 36 in the sense mode where the stylus pen 15 receives the synchronization signal from the touch panel controller 2, and the grip portion terminal 35 of the changeover switch 34 is connected to the ground terminal 37 in the driving mode where the pen point 38 of the stylus pen 15 is driven.

Therefore, the grip portion terminal 35 is connected to the ground terminal 37 in the driving mode, so that there is a difference of potential between the grip portion and the pen point 38. Accordingly, even when the pen point 38 of the stylus pen 15 is driven while a user is gripping the grip portion 28 of the stylus pen 15, a human body of the user gripping the stylus pen 15 is not driven and a signal based on the driving of the pen point 38 is able to be detected satisfactorily.

Further, since the grip portion terminal 35 is connected to the pen point terminal 36 in the sense mode, capacitance coupling between the stylus pen 15 and the touch panel 3 increases, thus making it possible to improve an SN ratio of the synchronization signal received from the touch panel controller 2.

Embodiment 2

Configurations of Touch Panel System 1 and Stylus Pens 15 and 33

Figure 10:
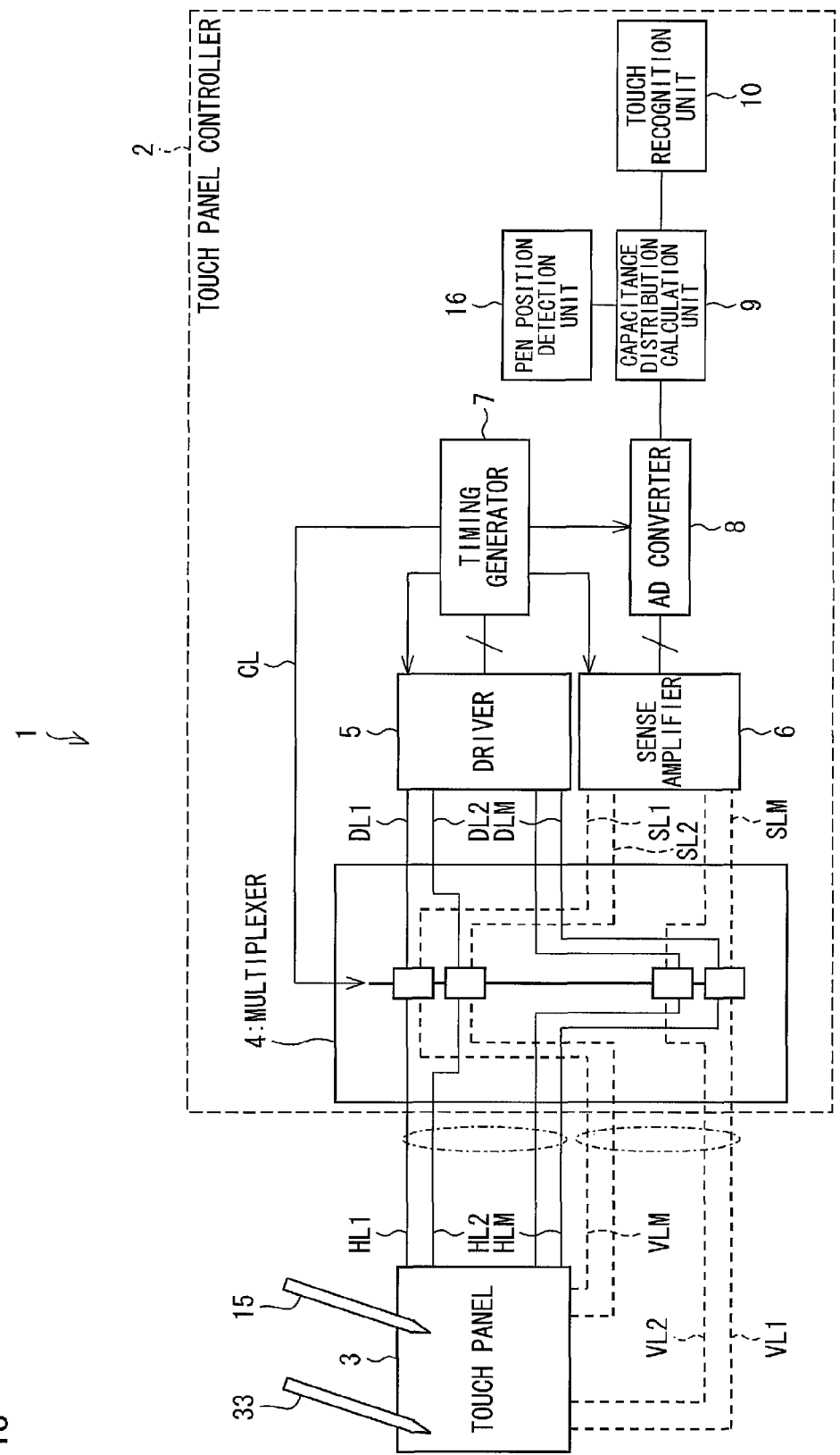
FIG. 10 is a block diagram illustrating a configuration of a touch panel system according to an embodiment 2.

An embodiment 2 of the invention will be described based on FIG. 10 to FIG. 11 as follows. Note that, for convenience of description, the same reference signs are assigned to members having the same functions as those of the members described in the aforementioned embodiment and description thereof will be omitted. FIG. 10 is a block diagram illustrating a configuration of a touch panel system 1 according to the embodiment 2.

The touch panel system according to the embodiment 1 described above, in which one stylus pen 15 is provided, has been described as an example. However, the invention is not limited thereto. Two or more stylus pens may be provided. The touch panel system 1 according to the embodiment 2 shown in FIG. 10 includes the touch panel 3, the touch panel controller 2 and two stylus pens 15 and 33. The stylus pen 33 has a similar configuration to that of the stylus pen 15.

The driver 5 of the touch panel controller 2 applies voltage to the drive lines DL1 to DLM based on M coded sequences among (M+2) coded sequences having the length N.

In synchronization with the driver 5, the drive circuit 26 of the stylus pen 15 applies voltage to the pen point 38 of the stylus pen 15 based on one of the remaining two coded sequences among the (M+2) coded sequences. The drive circuit 26 of the stylus pen 33 applies voltage to a pen point 38 of the stylus pen 33 based on the other of the remaining two coded sequences among the (M+2) coded sequences in synchronization with the aforementioned driver 5. In this manner, by driving the plurality of stylus pens 15 and 33 with different coded sequences, positions of the plurality of stylus pens 15 and 33 are able to be detected.

(Operation of Stylus Pens 15 and 33 of Touch Panel System 1)

Figure 11:
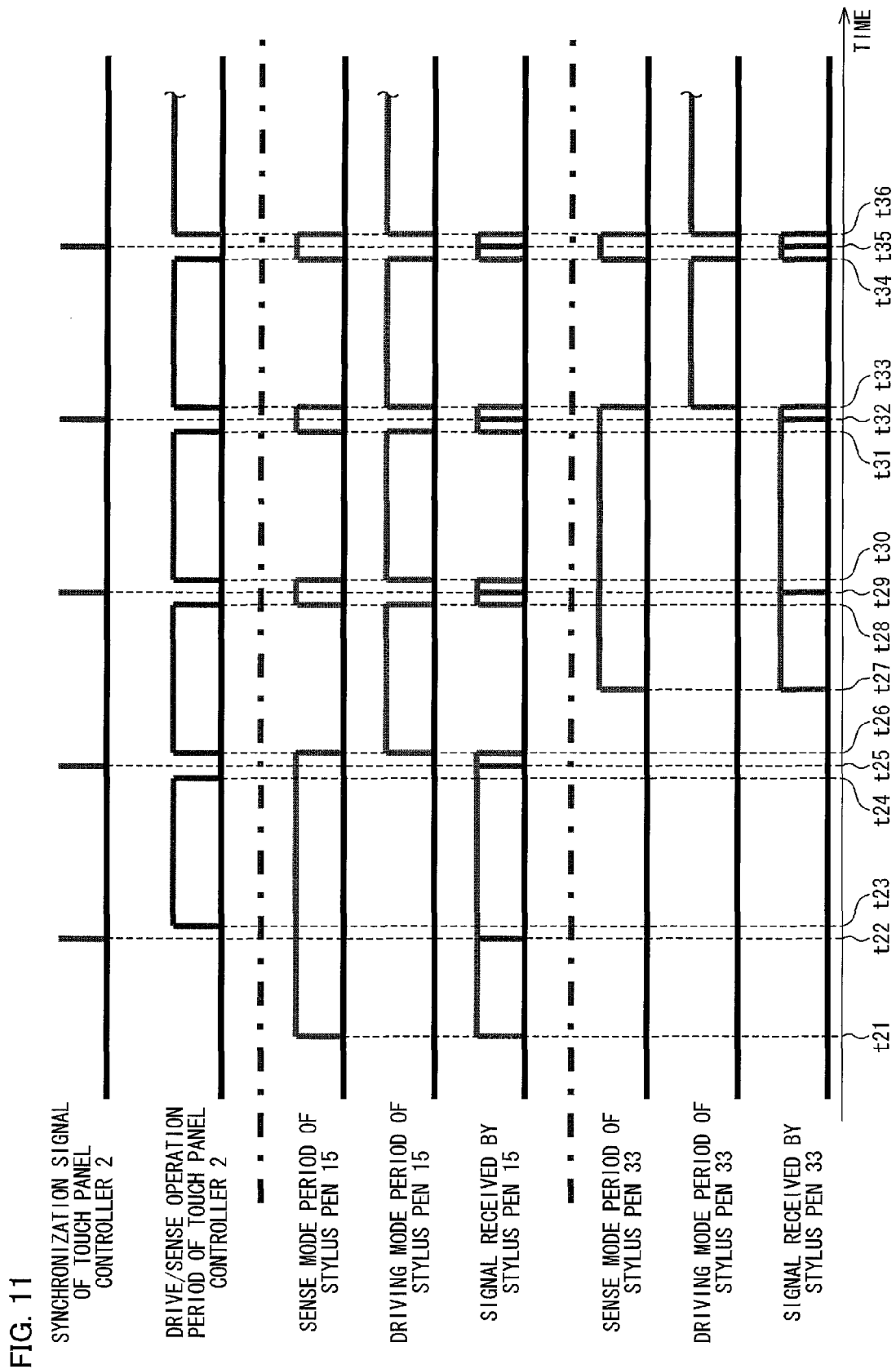
FIG. 11 is a timing chart of driving operation of a touch panel controller provided in the touch panel system and driving operation of two stylus pens provided in the touch panel system.

FIG. 11 is a timing chart of driving operation of the touch panel controller 2 and driving operation of the two stylus pens 15 and 33 provided in the touch panel system 1.

First, at a time t21, power of the stylus pen 15 is turned on, the operation changeover switch 24 is turned on, the operation changeover switch 25 is turned off and the changeover switch 34 connects the grip portion terminal 35 to the pen point terminal 36 (refer to FIG. 5), so that the sense mode period starts.

Thereafter, at a time t22, the touch panel controller 2 drives the signal lines HL1 to HLM and the signal lines VL1 to VLM with a synchronization signal. The sense circuit 21 of the stylus pen 15 receives the synchronization signal through the operation changeover switch 24. Then, at a time t23, the touch panel controller 2 drives the signal lines VL1 to VLM with the coded sequence. The touch panel controller 2 then finishes the driving of the signal lines VL1 to VLM at a time t24.

The touch panel controller 2 then drives the signal lines HL1 to HLM and the signal lines VL1 to VLM with a next synchronization signal at a time t25. The sense circuit 21 of the stylus pen 15 receives the next synchronization signal through the operation changeover switch 24. The synchronization signal detection circuit 22 detects the next synchronization signal which has been received by the sense circuit 21.

Next, at a time t26, the sense mode period of the stylus pen 15 ends and the driving mode period starts. The operation changeover switch 24 is turned off and the operation changeover switch 25 is turned on. The changeover switch 34 connects the grip portion terminal 35 to the ground terminal 37. The timing generator 23 drives the drive circuit 26 based on the next synchronization signal and the drive circuit 26 drives the pen point 38 through the operation changeover switch 25. The touch panel controller 2 drives the signal lines HL1 to HLM with the coded sequence based on the next synchronization signal.

At a time t27, power of the stylus pen 33 is turned on, the operation changeover switch 24 of the stylus pen 33 is turned on, the operation changeover switch 25 is turned off, and the changeover switch 34 of the stylus pen 33 connects the grip portion terminal 35 to the pen point terminal 36, so that the sense mode period starts.

Next, at a time t28, the driving mode period of the stylus pen 15 ends and a next sense mode period starts. The operation changeover switch 25 of the stylus pen 15 is turned off and the operation changeover switch 24 is turned on. The changeover switch 34 of the stylus pen 15 connects the grip portion terminal 35 to the pen point terminal 36. The touch panel controller 2 finishes the driving of the signal lines HL1 to HLM based on the next synchronization signal.

Thereafter, the touch panel controller 2 drives the signal lines HL1 to HLM and the signal lines VL1 to VLM with a third synchronization signal at a time t29. The sense circuits 21 of the stylus pen 15 and 33 receive the third synchronization signal through the operation changeover switches 24. The synchronization signal detection circuits 22 detect the third synchronization signal which has been received by the sense circuits 21.

Next, at a time t30, the next sense mode period of the stylus pen 15 ends and a next driving mode period starts. The operation changeover switch 24 of the stylus pen 15 is turned off again and the operation changeover switch 25 is turned on again. The changeover switch 34 of the stylus pen 15 connects the grip portion terminal 35 to the ground terminal 37. The timing generator 23 drives the drive circuit 26 based on the third synchronization signal and the drive circuit 26 drives the pen point 38 through the operation changeover switch 25. The touch panel controller 2 drives the signal lines VL1 to VLM with the coded sequence based on the third synchronization signal.

The next driving mode period of the stylus pen 15 ends and a third sense mode period starts at a time t31. The operation changeover switch 25 is turned off and the operation changeover switch 24 is turned on. The changeover switch 34 connects the grip portion terminal 35 to the pen point terminal 36. The touch panel controller 2 finishes the driving of the signal lines VL1 to VLM based on the third synchronization signal.

The touch panel controller 2 then drives the signal lines HL1 to HLM and the signal lines VL1 to VLM with a fourth synchronization signal at a time t32. The sense circuits 21 of the stylus pens 15 and 33 receive the fourth synchronization signal through the operation changeover switches 24. The synchronization signal detection circuits 22 of the stylus pens 15 and 33 detect the fourth synchronization signal which has been received by the sense circuits 21.

Next, at a time t33, the third sense mode period of the stylus pen 15 ends and a third driving mode period starts. The sense mode period of the stylus pen 33 ends and the driving mode period starts. The operation changeover switches 24 of the stylus pens 15 and 33 are turned off and the operation changeover switches 25 are turned on. The changeover switch 34 connects the grip portion terminal 35 to the ground terminal 37. The timing generator 23 drives the drive circuit 26 based on the fourth synchronization signal and the drive circuit 26 drives the pen point 38 through the operation changeover switch 25. The touch panel controller 2 drives the signal lines HL1 to HLM with the coded sequence based on the fourth synchronization signal.

Next, at a time t34, the third driving mode period of the stylus pen 15 ends and a fourth sense mode period starts. The first driving mode period of the stylus pen 33 ends and a second sense mode period starts. The operation changeover switch 25 is turned off and the operation changeover switch 24 is turned on. The changeover switch 34 connects the grip portion terminal 35 to the pen point terminal 36. The touch panel controller 2 finishes the driving of the signal lines HL1 to HLM based on the fourth synchronization signal.

The touch panel controller 2 then drives the signal lines HL1 to HLM and the signal lines VL1 to VLM with a fifth synchronization signal at a time t35. The sense circuits 21 of the stylus pens 15 and 33 receive the fifth synchronization signal through the operation changeover switch 24. The synchronization detection circuits 22 detect the fifth synchronization signal which has been received by the sense circuits 21.

Similar operation is repeated at a time t36 and subsequent times.

In this manner, with the touch panel system according to the embodiment 2, the two stylus pens 15 and 33 are able to be used.

Embodiment 3

An embodiment 3 of the invention will be described based on FIG. 12 to FIG. 15 as follows. Note that, for convenience of description, the same reference signs are assigned to members having the same functions as those of the members described in the aforementioned embodiments and description thereof will be omitted.

Figure 12:
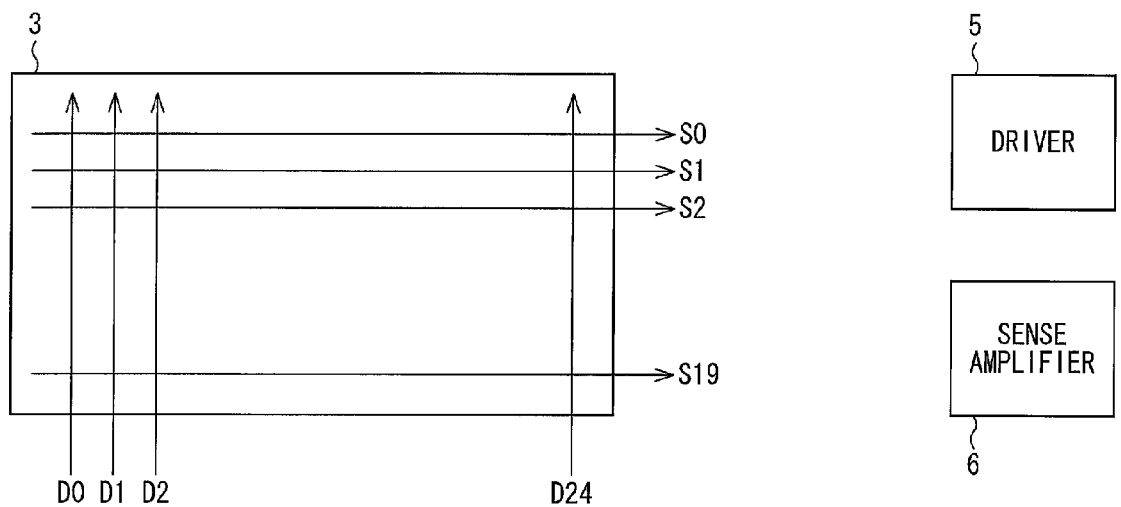
FIG. 12 is a view describing operation of a touch panel system of a sequential drive.

FIG. 12 is a view describing operation of a touch panel system of a sequential drive. The touch panel system includes the touch panel 3, the driver 5, and the sense amplifier 6. The touch panel 3 has twenty-five drive lines D0 to D24 extending in the vertical direction and twenty sense lines S0 to S19 extending in the horizontal direction. The driver 5 selects the drive lines D0, D1, D2, . . . , and D24 in this order for driving.

With respect to each of the sense lines S0, S1, . . . , and S19, the sense amplifier 6 outputs a signal based on charges of electrostatic capacitances between the respective sense lines S0 to S19 and the drive line D0 at a time when the drive line D0 is driven, and outputs a signal based on charges of electrostatic capacitances between the respective sense lines S0 to S19 and the drive line D1 at a time when the drive line D1 is driven. Subsequently, the sense amplifier 6 similarly outputs a signal based on charges of electrostatic capacitances between the respective sense lines S0 to S19 and the drive line D24 at a time when the drive line D24 is driven.

Figure 13:
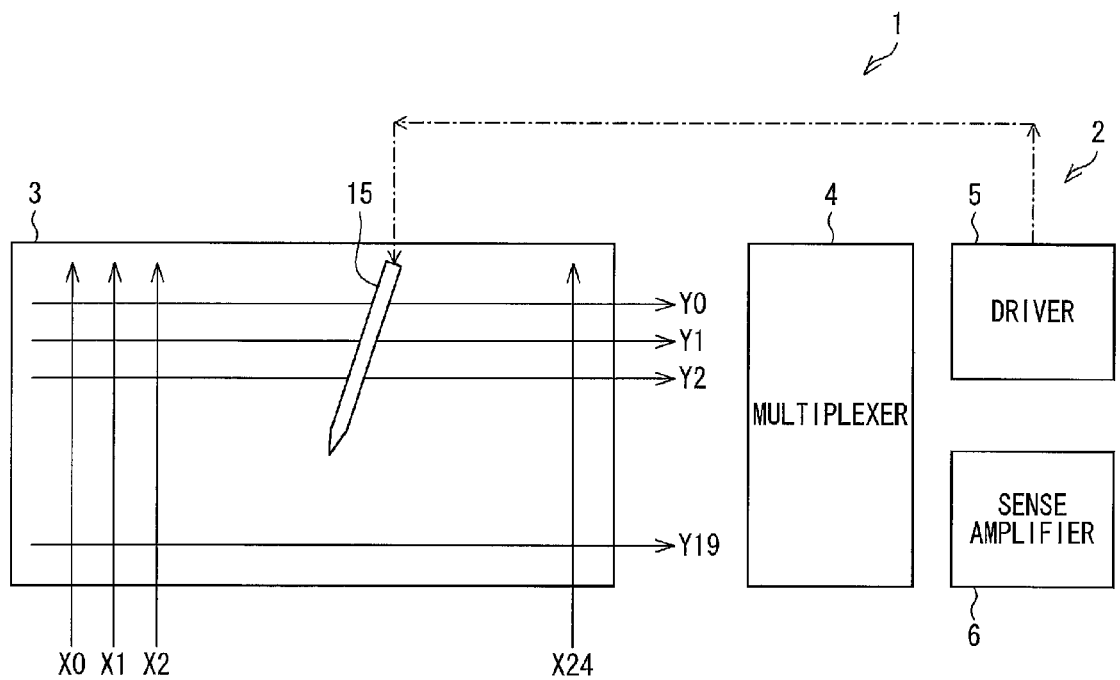
FIG. 13 is a view describing a part of operation of a touch panel system according to an embodiment 3.
Figure 14:
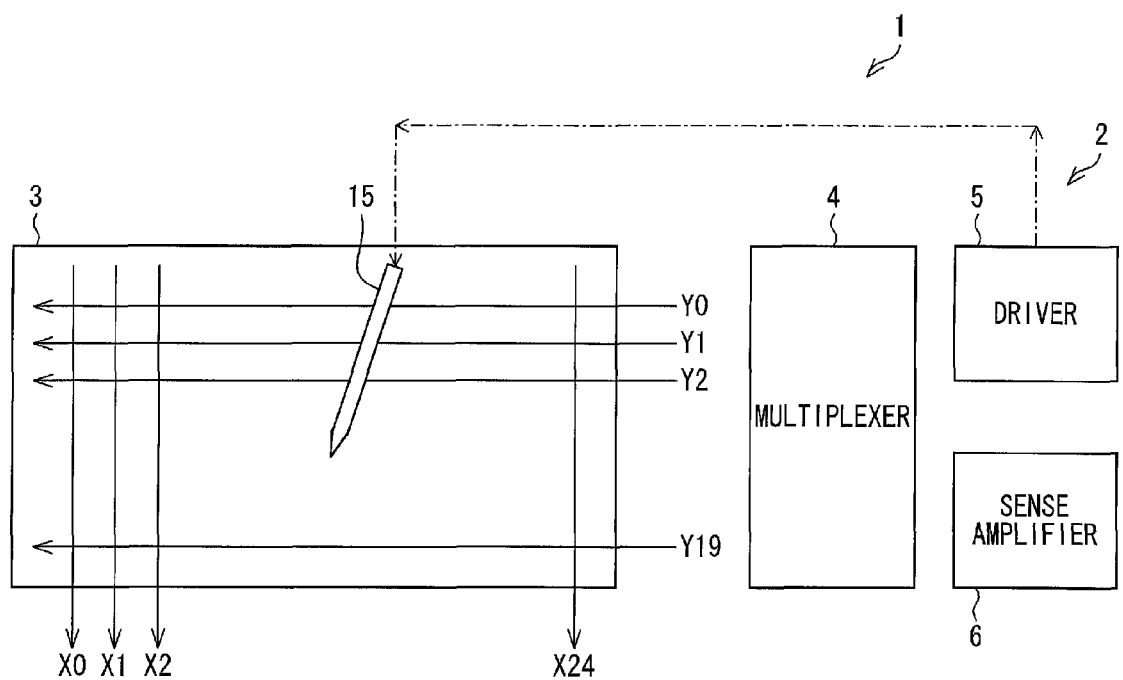
FIG. 14 is a view describing a remaining part of the operation of the touch panel system.

FIG. 13 is a view describing a part of operation of a touch panel system 1 according to the embodiment 3. FIG. 14 is a view describing a remaining part of the operation of the touch panel system 1. The touch panel system 1 includes the touch panel 3, the multiplexer 4, the driver 5, the sense amplifier 6, and the stylus pen 15. The stylus pen 15 has the sense circuit 21, the synchronization signal detection circuit 22, the timing generator 23, the operation changeover switches 24 and 25, the drive circuit 26, and the changeover switch 34 as described above in FIG. 5.

The touch panel 3 has twenty-five signal lines X0 to X24 extending in the vertical direction and twenty signal lines Y0 to Y19 extending in the horizontal direction.

Figure 15:
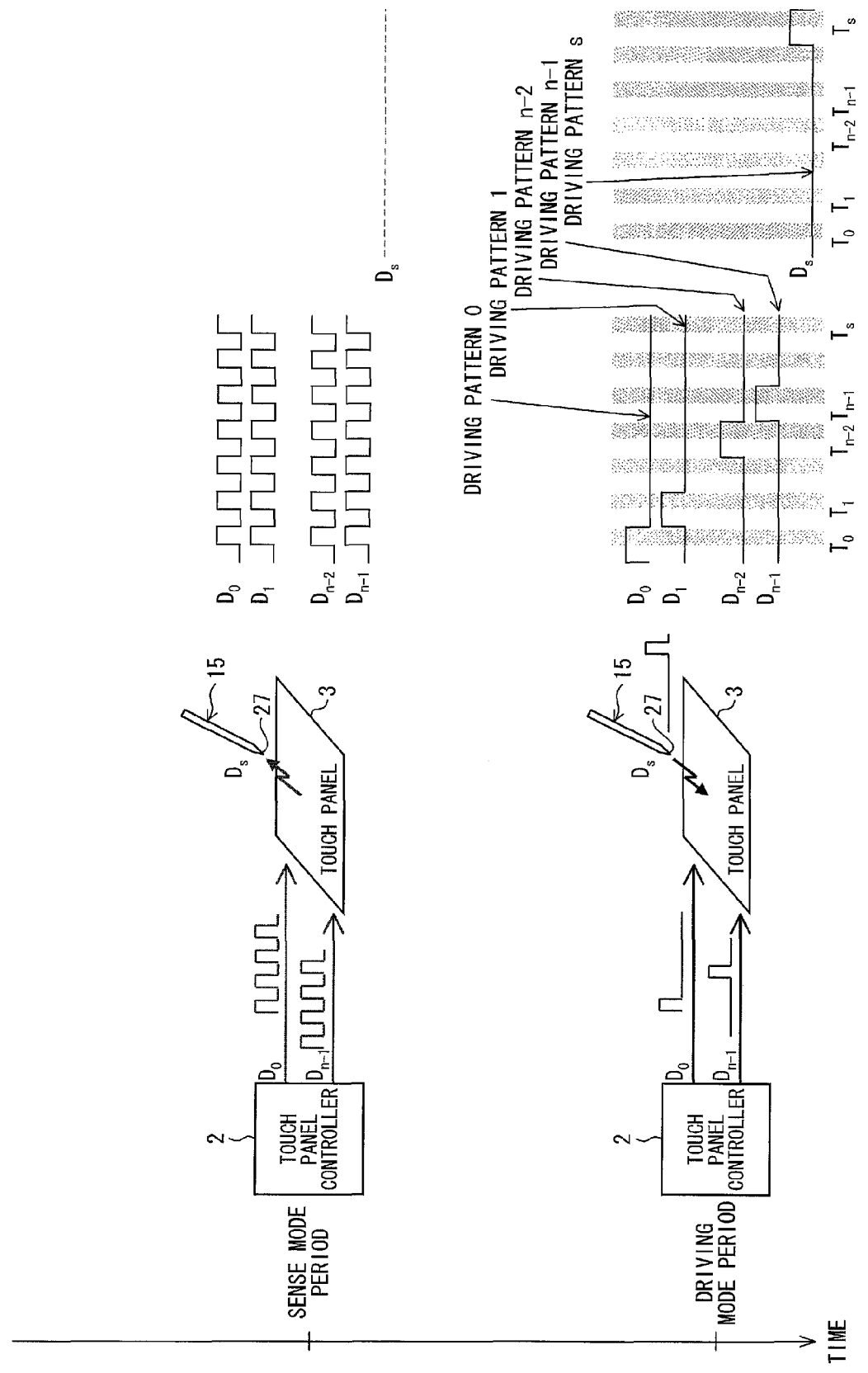
FIG. 15 is a view describing driving operation of a touch panel controller and a stylus pen, which are provided in the touch panel system.

FIG. 15 is a view describing driving operation of the touch panel controller 2 and the stylus pen 15. A period of the driving operation of the stylus pen 15 includes a sense mode period for detecting the synchronization signal from the touch panel controller 2 by the synchronization signal detection circuit 22 and a driving mode period for driving the pen point 38 by the drive circuit 26.

During a period in which the touch panel controller outputs the synchronization signal, the touch panel controller 2 drives all the drive lines or all the lines (X0 to X24 and Y0 to Y19 in the examples of FIG. 13 and FIG. 14) with the same waveform (synchronization signal). During the sense mode period, the operation changeover switch 24 of the stylus pen 15 is turned on, the operation changeover switch 25 is turned off, and the sense circuit 21 receives the synchronization signal from the touch panel controller 2 through the operation changeover switch 24. Accordingly, the pen point 38 of the stylus pen 15 is not driven during the sense mode period. The grip portion terminal 35 of the changeover switch 34 is connected to the pen point terminal 36 during the sense mode period.

During the driving mode period, the operation changeover switch 25 of the stylus pen 15 is turned on and the operation changeover switch 24 is turned off. The grip portion terminal 35 of the changeover switch 34 is connected to the ground terminal 37 during the driving mode period. The touch panel controller 2 sequentially drives the drive lines D0 to D(n−1) with a driving pattern 0 to a driving pattern (n−1). Thereafter, the drive circuit 26 of the stylus pen 15 drives the pen point 38 with a driving pattern 2.

In a waveform view shown in FIG. 15, during a period in which the drive line D0 is High, information of capacitances between the drive line D0 driving with the driving pattern 0 and the sense lines is collected. Similarly, during a period in which the drive line D1 is High, information of capacitances between the drive line D1 driving with the driving pattern 1 and the sense lines is collected, and similarly, during a period in which the drive line Dn−1 is High, information of capacitances between the drive line driving with the driving pattern (n−1) and the sense lines is collected. In a period in which the drive line Ds of the stylus pen 15 is High, information of capacitances between the pen point 38 of the stylus pen 15, which is driving with the driving pattern s, and the respective sense lines is collected. In this case, s>(n−1).

The operation of the touch panel system during the driving mode period will be described specifically below.

With reference to FIG. 13, the multiplexer 4 firstly connects the signal lines X0 to X24 with the driver 5 and connects the signal lines Y0 to Y19 with the sense amplifier 6. Next, the driver 5 drives the signal lines X0 to X24 in order through the multiplexer 4. After the driver 5 drives the signal line X24, the drive circuit 26 of the stylus pen 15 then drives the pen point 38 of the stylus pen 15 (FIG. 5).

With respect to each of the signal lines Y0, Y1, . . . , and Y19, the sense amplifier 6 receives a signal based on charges of electrostatic capacitances between the respective signal lines Y0 to Y19 and the signal line X0 through the multiplexer 4 at a time when the signal line X0 is driven, and receives a signal based on charges of electrostatic capacitances between the respective signal lines Y0 to Y19 and the signal line X1 through the multiplexer 4 at a time when the signal line X1 is driven. Subsequently, the sense amplifier 6 similarly receives a signal based on charges of electrostatic capacitances between the respective signal lines Y0 to Y19 and the signal line X24 through the multiplexer 4 at a time when the signal line X24 is driven. Then, at a time when the stylus pen 15 is driven, a first pen signal based on electrostatic capacitances between the stylus pen 15 and the respective signal lines Y0 to Y19 is received through the multiplexer 4.

Thereby, distribution of the electrostatic capacitances in the entire surface of the touch panel 3 and a position of the stylus pen 15 in the vertical direction are found.

With reference to FIG. 14, the multiplexer 4 connects the signal lines X0 to X24 with the sense amplifier 6 and connects the signal lines Y0 to Y19 with the driver 5. Next, the driver 5 drives the signal lines Y0 to Y19 in order through the multiplexer 4. After the driver 5 drives the signal line Y19, the drive circuit 26 of the stylus pen 15 then drives the pen point 38 of the stylus pen 15.

With respect to each of the signal lines X0, X1, . . . , and X24, the sense amplifier 6 receives a signal based on charges of electrostatic capacitances between the respective signal lines X0 to X24 and the signal line Y0 through the multiplexer 4 at a time when the signal line Y0 is driven, and receives a signal based on charges of electrostatic capacitances between the respective signal lines X0 to X24 and the signal line Y1 through the multiplexer 4 at a time when the signal line Y1 is driven. Subsequently, the sense amplifier 6 similarly receives a signal based on charges of electrostatic capacitances between the respective signal lines X0 to X24 and the signal line Y19 through the multiplexer 4 at a time when the signal line Y19 is driven. Then, at a time when the stylus pen 15 is driven, a signal based on electrostatic capacitances between the stylus pen 15 and the respective signal lines X0 to X24 is received through the multiplexer 4.

Thereby, distribution of the electrostatic capacitances in the entire surface of the touch panel 3 and a position of the stylus pen 15 in the horizontal direction are found.

Accordingly, with the aforementioned position of the stylus pen 15 in the vertical direction and the aforementioned position of the stylus pen 15 in the horizontal direction, an X coordinate and a Y coordinate of the stylus pen 15 on the touch panel 3 are found.

Embodiment 4

Figure 16:
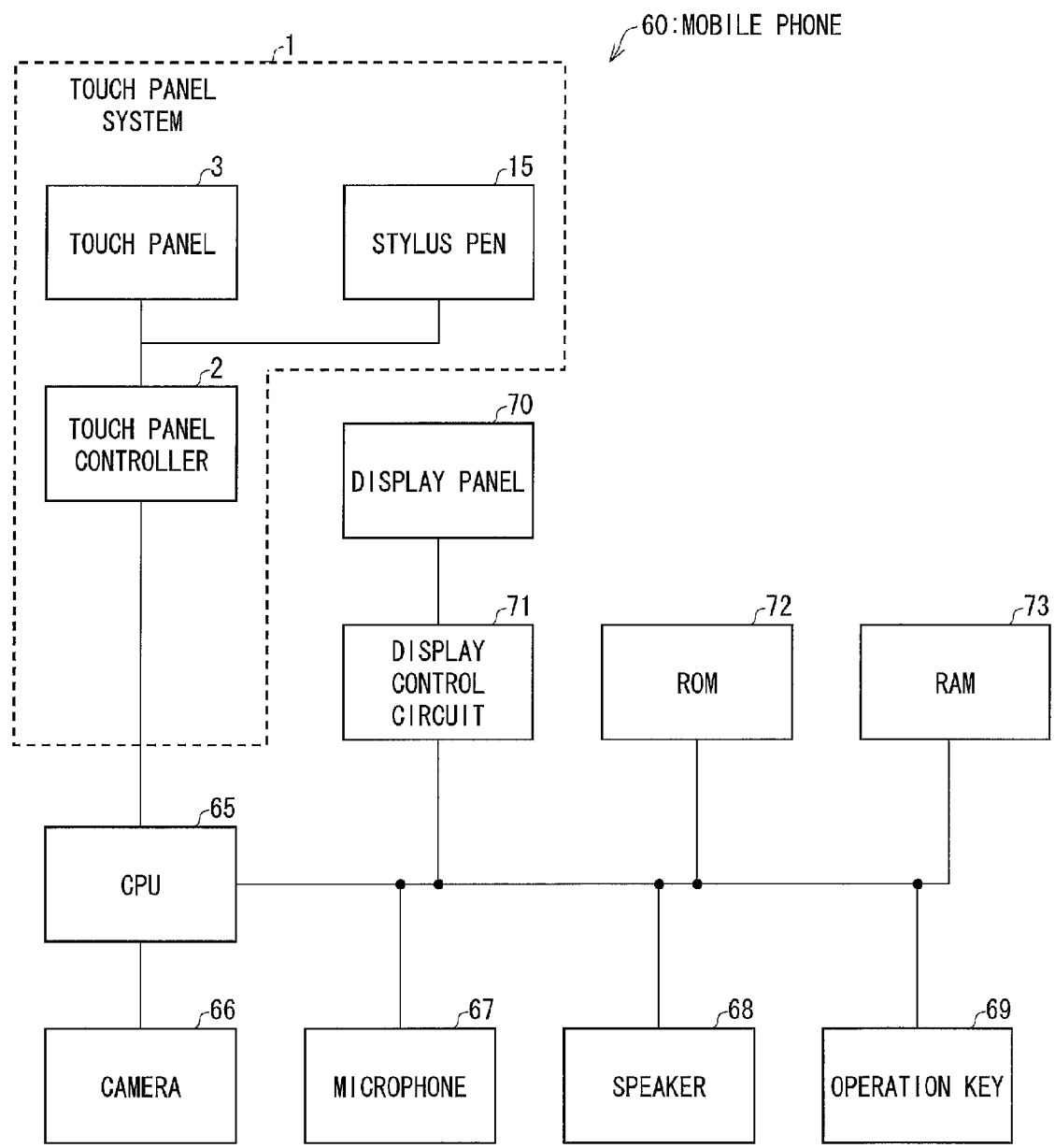
FIG. 16 is a block diagram illustrating a configuration of a mobile phone according to an embodiment 4.

An embodiment 4 of the invention will be described based on FIG. 16 as follows. FIG. 16 is a block diagram illustrating a configuration of a mobile phone 60 according to the embodiment 4.

The mobile phone 60 includes a CPU 65, a RAM 73, a ROM 72, a camera 66, a microphone 67, a speaker 68, an operation key 69, a display panel 70, a display control circuit 71, and the touch panel system 1. Respective components are mutually connected by a data bus.

The CPU 65 controls operation of the mobile phone 60. The CPU 65 executes, for example, a program stored in the ROM 72. The operation key 69 receives an input of an instruction by a user of the mobile phone 60. The RAM 73 stores data which is generated by execution of the program by the CPU 65 or data which is input through the operation key 69, in a volatile manner. The ROM 72 stores data in a non-volatile manner.

Further, the ROM 72 is a ROM which allows writing and deletion, such as an EPROM (Erasable Programmable Read-Only Memory) or a flash memory. Note that, though not shown in FIG. 16, the mobile phone 60 may be composed to include an interface (IF) for being connected with another electronic device by cable.

The camera 66 photographs an object according to operation of the operation key 69 by the user. Image data of the object which is photographed is stored in the RAM 73 or an external memory (for example, memory card). The microphone 67 receives input of voice of the user. The mobile phone 60 digitizes the voice which is input (analog data). The mobile phone 60 then transmits the voice which is digitized to a communication target (for example, another mobile phone). The speaker 68 outputs sound, for example, based on music data or the like stored in the RAM 73.

The touch panel system 1 has the touch panel 3, the touch panel controller 2 that detects an electrostatic capacitance or a difference of the electrostatic capacitance, and the stylus pen 15. The CPU 65 controls operation of the touch panel system 1. The display panel 70 displays an image stored in the ROM 72 or the RAM 73 by the display control circuit 71. The display panel 70 is overlapped with the touch panel 3 or incorporates the touch panel 3. Note that, a touch recognition signal which is generated by the touch recognition unit 10 to indicate a touch position on the touch panel 3 may have the same function as that of a signal indicating that the operation key 69 is operated.

[Overview]

A touch panel system (1) according to an aspect 1 of the invention is the touch panel system (1) including: a stylus pen (15) for touching a touch panel (3) which has M first signal lines (signal lines HL1 to HLM) (M is plural), K second signal lines (signal lines VL1 to VLK) (K is plural) which intersect with the M first signal lines (signal lines HL1 to HLM), and (M×K) electrostatic capacitances formed at respective intersections of the first signal lines (signal lines HL1 to HLM) and the second signal lines (signal lines VL1 to VLK); and a touch panel controller (2) that detects a position of the stylus pen (15), in which the stylus pen (15) has: a grip portion (28) to be gripped by a user; a pen point (38) that touches the touch panel (3); a ground (ground terminal 37) having a ground potential; and a changeover switch (34) that connects the grip portion (28) to either the pen point (38) or the ground (ground terminal 37).

With the aforementioned configuration, when the changeover switch connects the grip portion to the ground, it is possible to provide a difference of potential between the pen point and the grip portion. Thus, when the pen point of the stylus pen is driven, a human body of a user gripping the grip portion is prevented from being driven. Accordingly, it is possible to block driving of even a palm placing region where the user places his/her palm on the touch panel similarly to the pen point, so that it does not occur that a signal based on the driving of the pen point is buried in a signal based on the driving of the palm placing region. As a result thereof, the signal based on the driving of the pen point of the stylus pen is able to be detected satisfactorily.

In a touch panel system (1) according to an aspect 2 of the invention, in the aforementioned aspect 1, the touch panel controller (2) may include a driver (5) that drives the M first signal lines (signal lines HL1 to HLM) to output a first linear sum signal based on charges, which are accumulated in the electrostatic capacitances, along the K second signal lines (signal lines VL1 to VLK), and then drives the K second signal lines (signal lines VL1 to VLK) to output a second linear sum signal based on the charges, which are accumulated in the electrostatic capacitances, along the M first signal lines (signal lines HL1 to HLM); and position detection means (capacitance distribution calculation unit 9) that detects a position of a target, which has touched the touch panel (3), based on the first linear sum signal and the second linear sum signal, and the stylus pen (15) may have: a synchronization circuit (sense circuit 21, synchronization signal detection circuit 22, timing generator 23) that receives a synchronization signal output from the driver (5); and a driving circuit (drive circuit 26) that drives the pen point (38) based on an output from the synchronization circuit (sense circuit 21, synchronization signal detection circuit 22, timing generator 23).

With the aforementioned configuration, since the driving circuit that drives the pen point based on the output of the synchronization circuit is provided in the stylus pen, it is possible to drive the pen point satisfactorily in synchronization with driving of the first signal lines or the second signal lines by the touch panel controller.

A touch panel system (1) according to an aspect 3 of the invention may have a sense mode in which the synchronization circuit (sense circuit 21, synchronization signal detection circuit 22, timing generator 23) receives the synchronization signal from the touch panel controller (2) and a driving mode in which the driving circuit (drive circuit 26) drives the pen point (38), and the changeover switch (34) may connect grip portion (28) to the pen point (38) in the sense mode and may connect the grip portion (28) to the ground (ground terminal 37) in the driving mode in the aforementioned aspect 2.

With the aforementioned configuration, by connecting the grip portion to the pen point in the sense mode, capacitance coupling between the stylus pen and the touch panel increases, thus making it possible to improve an SN ratio of the synchronization signal received from the touch panel controller. Further, by connecting the grip portion to the ground in the driving mode, it is possible to provide a difference of potential between the pen point and the grip portion. Thus, in the driving mode in which the pen point of the stylus pen is driven, a human body of a user gripping the grip portion is prevented from being driven. Accordingly, it does not occur that a signal based on the driving of the pen point is buried in a signal based on the driving of the palm placing region. As a result thereof, the signal based on the driving of the pen point of the stylus pen is able to be detected satisfactorily.

In a touch panel system (1) according to an aspect 4 of the invention, the driver (5) may drive the M first signal lines (signal lines HL1 to HLM) in parallel and drive the K second signal lines (signal lines VL1 to VLK) in parallel.

With the aforementioned configuration, it is possible to satisfactorily detect a signal based on the driving of the pen point of the stylus pen on the touch panel of a parallel drive.

In a touch panel system (1) according to an aspect 5 of the invention, the driver (5) may sequentially select the M first signal lines (signal lines HL1 to HLM) for driving and sequentially select the K second signal lines (signal lines VL1 to VLK) for driving.

With the aforementioned configuration, it is possible to satisfactorily detect a signal based on the driving of the pen point of the stylus pen on the touch panel of a sequential drive.

A touch panel system (1) according to an aspect 6 of the invention is the touch panel system (1) including: a plurality of stylus pens (15, 33) for touching a touch panel (3) which has M first signal lines (signal lines HL1 to HLM) (M is plural), K second signal lines (signal lines VL1 to VLK) (K is plural) which intersect with the M first signal lines, and (M×K) electrostatic capacitances formed at respective intersections of the first signal lines (signal lines HL1 to HLM) and the second signal lines (signal lines VL1 to VLK); and a touch panel controller (2) that detects a position of each of the stylus pens (15 33), in which each of the stylus pens (15, 33) has: a grip portion (28) to be gripped by a user; a pen point (38) that touches the touch panel (3); a ground (ground terminal 37) having a ground potential; and a changeover switch (34) that connects the grip portion (28) to either the pen point (38) or the ground (ground terminal 37).

With the aforementioned configuration, when the changeover switch connects the grip portion to the ground in the plurality of stylus pens, it is possible to provide a difference of potential between the pen point and the grip portion. Thus, when the pen point of each of the stylus pens is driven, a human body of a user gripping the grip portion is prevented from being driven. Accordingly, it is possible to block driving of even a palm placing region where the user places his/her palm on the touch panel similarly to the pen point, so that it does not occur that a signal based on the driving of the pen point is buried in a signal based on the driving of the palm placing region. As a result thereof, the signal based on the driving of the pen point of each of the plurality of stylus pens is able to be detected satisfactorily.

A stylus pen (15) according to an aspect 7 of the invention is the stylus pen (15) for touching a touch panel (3) which has M first signal lines (signal lines HL1 to HLM) (M is plural), K second signal lines (signal lines VL1 to VLK) (K is plural) which intersect with the M first signal lines (signal lines HL1 to HLM), and (M×K) electrostatic capacitances formed at respective intersections of the first signal lines (signal lines HL1 to HLM) and the second signal lines (signal lines VL1 to VLK), including: a grip portion (28) to be gripped by a user; a pen point (38) that touches the touch panel (3); a ground (ground terminal 37) having a ground potential; and a changeover switch (34) that connects the grip portion (28) to either the pen point (38) or the ground (ground terminal 37).

With the aforementioned configuration, when the changeover switch connects the grip portion to the ground, it is possible to provide a difference of potential between the pen point and the grip portion. Thus, when the pen point of the stylus pen is driven, a human body of a user gripping the grip portion is prevented from being driven. Accordingly, it is possible to block driving of even a palm placing region where the user places his/her palm on the touch panel similarly to the pen point, so that it does not occur that a signal based on the driving of the pen point is buried in a signal based on the driving of the palm placing region. As a result thereof, the signal based on the driving of the pen point of the stylus pen is able to be detected satisfactorily.

An electronic device according to an aspect 8 of the invention includes the touch panel system according to the aspect 1 of the invention.

With the aforementioned configuration, when the changeover switch connects the grip portion to the ground, it is possible to provide a difference of potential between the pen point and the grip portion. Thus, when the pen point of the stylus pen is driven, a human body of a user gripping the grip portion is prevented from being driven. Accordingly, it is possible to block driving of even a palm placing region where the user places his/her palm on the touch panel similarly to the pen point, so that it does not occur that a signal based on the driving of the pen point is buried in a signal based on the driving of the palm placing region. As a result thereof, it is possible to obtain the electronic device capable of satisfactorily detecting the signal based on the driving of the pen point of the stylus pen.

The invention is not limited to each of the embodiments described above, and may be modified in various manners within the scope shown in the claims and an embodiment achieved by appropriately combining technical means disclosed in each of different embodiments is also encompassed in the technical scope of the invention. Further, by combining the technical means disclosed in each of the embodiments, a new technical feature may be formed.

INDUSTRIAL APPLICABILITY

The invention is able to be used for a stylus pen for touching a touch panel which has a plurality of electrostatic capacitances formed at respective intersections of a plurality of first signal lines and a plurality of second signal lines and a touch panel system using the same, and particularly able to be used for a stylus pen for touching a touch panel that drives a plurality of first signal lines and a plurality of second signal lines alternately and a touch panel system using the same.

REFERENCE SIGNS LIST 1 touch panel system
2 touch panel controller
3 touch panel
4 multiplexer
5 driver (first driving means, second driving means)
6 sense amplifier
7 timing generator
8 AD converter
9 capacitance distribution calculation unit (position detection means)
10 touch recognition unit
15 stylus pen
16 pen position detection unit
21 sense circuit (synchronization circuit)
22 synchronization signal detection circuit (synchronization circuit)
23 timing generator (synchronization circuit)
26 drive circuit (driving circuit)
27 pen main body
28 grip portion
29 pen point portion
30 pen point cover
31 pen point rod
32 insulating body
33 stylus pen
34 changeover switch
35 grip portion terminal
36 pen point terminal
37 ground terminal
38 pen point

The invention claimed is:

1. A touch panel system including: a stylus pen for touching a touch panel which has M first signal lines (M is plural), K second signal lines (K is plural) which intersect with the M first signal lines, and (M×K) electrostatic capacitances formed at respective intersections of the first signal lines and the second signal lines; and a touch panel controller that detects a position of the stylus pen, wherein
the stylus pen has:
a grip portion to be gripped by a user;
a pen point that touches the touch panel;
a ground having a ground potential; and
a changeover switch configured to switch between the pen point and the ground to connect the grip portion to either the pen point or the ground, wherein the touch panel controller includes:
a driver that drives the M first signal lines to output a first linear sum signal based on charges, which are accumulated in the electrostatic capacitances, along the K second signal lines, and then drives the K second signal lines to output a second linear sum signal based on the charges, which are accumulated in the electrostatic capacitances, along the M first signal lines; and position detection means that detects a position of a target, which has touched the touch panel, based on the first linear sum signal and the second linear sum signal, and the stylus pen has:

a synchronization circuit that receives a synchronization signal output from the driver; and a driving circuit that drives the pen point based on an output from the synchronization circuit.

2. The touch panel system according to claim 1, wherein the touch panel system has a sense mode in which the synchronization circuit receives the synchronization signal from the touch panel controller and a driving mode in which the driving circuit drives the pen point, and the changeover switch connects the grip portion to the pen point in the sense mode and connects the grip portion to the ground in the driving mode.

3. A touch panel system including: a plurality of stylus pens for touching a touch panel which has M first signal lines (M is plural), K second signal lines (K is plural) which intersect with the M first signal lines, and (M×K) electrostatic capacitances formed at respective intersections of the first signal lines and the second signal lines; and a touch panel controller that detects a position of each of the stylus pens, wherein each of the stylus pens has:

a grip portion to be gripped by a user;

a pen point that touches the touch panel;

a ground having a ground potential; and a changeover switch configured to switch between the pen point and the ground to connect the grip portion to either the pen point or the ground, wherein the touch panel controller includes:

a driver that drives the M first signal lines to output a first linear sum signal based on charges, which are accumulated in the electrostatic capacitances, along the K second signal lines, and then drives the K second signal lines to output a second linear sum signal based on the charges, which are accumulated in the electrostatic capacitances, along the M first signal lines; and position detection means that detects a position of a target, which has touched the touch panel, based on the first linear sum signal and the second linear sum signal, and the stylus pen has:

a synchronization circuit that receives a synchronization signal output from the driver; and a driving circuit that drives the pen point based on an output from the synchronization circuit.

4. An electronic device including the touch panel system according to claim 1.

* * * * *